United States Patent
Shin et al.

(10) Patent No.: US 7,567,048 B2
(45) Date of Patent: Jul. 28, 2009

(54) POWER CONVERSION CONTROL APPARATUS AND POWER CONVERSION CONTROL METHOD

(75) Inventors: Kentarou Shin, Yokohama (JP); Kraisorn Throngnumchai, Yokohama (JP); Yasuaki Hayami, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 103 days.

(21) Appl. No.: 11/907,343

(22) Filed: Oct. 11, 2007

(65) Prior Publication Data

US 2008/0089444 A1 Apr. 17, 2008

(51) Int. Cl.
*H02P 6/00* (2006.01)
(52) U.S. Cl. .............................. 318/400.24; 318/400.25
(58) Field of Classification Search ............ 318/400.24, 318/400.25; 363/132
See application file for complete search history.

(56) References Cited

U.S. PATENT DOCUMENTS 4,808,903 A * 2/1989 Matsui et al. ............... 318/800

FOREIGN PATENT DOCUMENTS

JP 7-099795 A 4/1995

* cited by examiner

*Primary Examiner*—Shawn Riley
(74) *Attorney, Agent, or Firm*—Foley & Lardner LLP

(57) ABSTRACT

An inverter system comprises a PWM generator that generates a control signal that causes a switching device to output an output value, a carrier signal generator that outputs a carrier signal to the PWM generator, a carrier frequency changing unit that changes a frequency of the carrier signal, and a target frequency setting unit that sets a target frequency and calculates a specific frequency from the target frequency. The carrier frequency changing unit changes a carrier frequency so that the specific frequency matches with a harmonic component of each of values of the carrier frequency.

12 Claims, 25 Drawing Sheets

$f_{mq} = f_{ch}/(m_q+0.5)$
$f_{ch}$ : CHANNEL FREQUENCY
$f_{max}$ : UPPER LIMIT VALUE
$f_{min}$ : LOWER LIMIT VALUE
$m_q$ : NATURAL NUMBER, q=1, 2, ···, r fch : CHANNEL DETECTOR
BAND : CHANNEL BAND $\Delta = (fmin-BAND)/2$ fch = 1242kHz (NIPPON BROADCASTING SYSTEM)
BAND = 10kHz
fmax = 100kHz
fmin = 50kHz
$\Delta = (50\text{kHz} - 10\text{kHz})/2 = 20\text{kHz}$
mq = 13~23
(a) $(\text{fch} - \Delta)/(\text{mq}+0.5) = 1222\text{kHz}/(\text{mq}+0.5)$
(b) $\text{fch}/(\text{mq}+0.5) = 1242\text{kHz}/(\text{mq}+0.5)$
(c) $(\text{fch} + \Delta)/(\text{mq}+0.5) = 1262\text{kHz}/(\text{mq}+0.5)$

| mq+0.5 | (a) | (b) | (c) |
|---|---|---|---|
| 13.5 | 90.52 | 92.00 | 93.48 |
| 14.5 | 84.28 | 85.66 | 87.03 |
| 15.5 | 78.84 | 80.13 | 81.42 |
| 16.5 | 74.06 | 75.27 | 76.48 |
| 17.5 | 69.83 | 70.97 | 72.11 |
| 18.5 | 66.05 | 67.14 | 68.22 |
| 19.5 | 62.67 | 63.69 | 64.72 |
| 20.5 | 59.61 | 60.59 | 61.56 |
| 21.5 | 56.84 | 57.77 | 58.70 |
| 22.5 | 54.31 | 55.20 | 56.09 |
| 23.5 | 52.00 | 52.85 | 53.70 |

$\Delta = (50-10)/2 = 20 kHz$ fnq=fs/nq
fs : SPECIFIC FREQUENCY
fmax : UPPER LIMIT VALUE
fmin : LOWER LIMIT VALUE
nq : NATURAL NUMBER, q=1, 2, ··, r

FIG. 19B

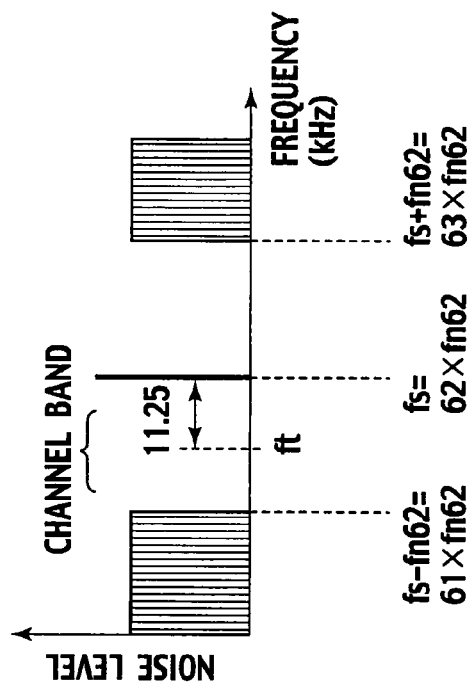
FIG. 21C
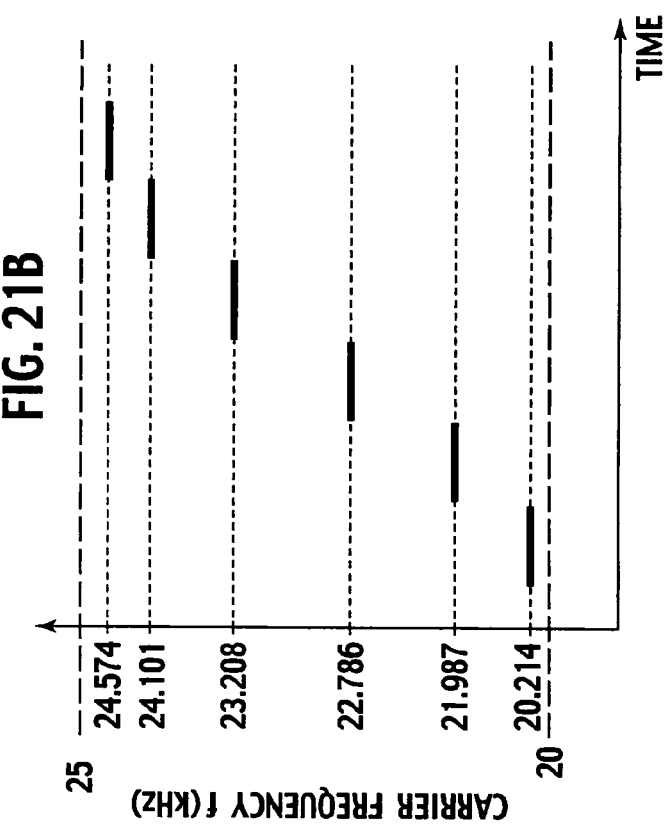
FIG. 21A
ft = 1242kHz (NIPPON BROADCASTING SYSTEM)
fs = 1253.25kHz (SPECIFIC FREQUENCY)
fmax = 25kHz
fmin = 20kHz
fnq = 1253.25/np (kHz)
nq = 62, 57, 55, 54, 52, 51
FIG. 21B

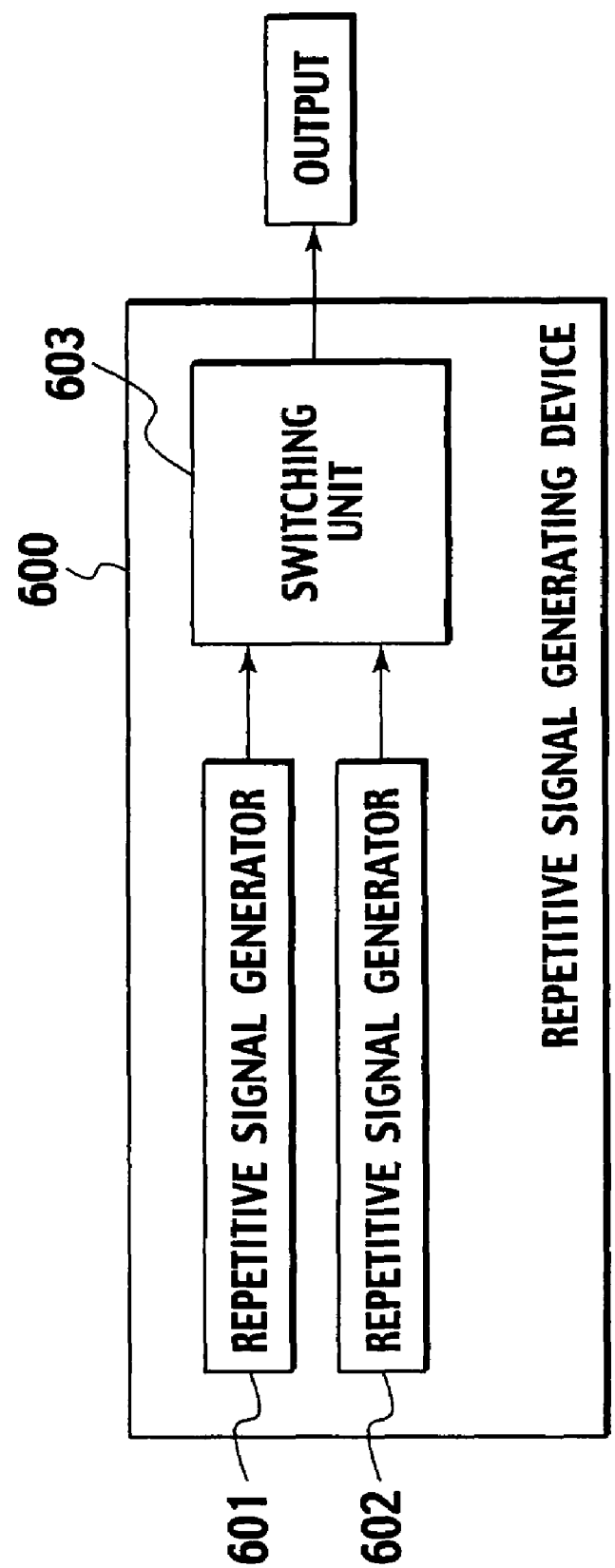

US 7,567,048 B2

POWER CONVERSION CONTROL APPARATUS AND POWER CONVERSION CONTROL METHOD

BACKGROUND OF THE INVENTION

1. Field of the Invention

The present invention relates to a power conversion control apparatus and a power conversion control method used for motor control or the like.

2. Description of the Related Art

A conventional power conversion control apparatus changes a carrier wave frequency both discretely and sinusoidally in PWM (Pulse-Width Modulation) control in order to reduce electromagnetic noises that occur owing to the opening/closing of a switch. In this manner, the electromagnetic noises are reduced by diffusing the electromagnetic noses in a wide frequency band (see Japanese Patent Application Laid-open No. H7-99795).

SUMMARY OF THE INVENTION

An object the present invention is to reduce electromagnetic noises below a predetermined value.

A power conversion control apparatus and power conversion control method according to the present invention sets a target frequency the electromagnetic noises of which need to be reduced below a predetermined lower limit value, calculates a specific frequency from the set target frequency, and changes a frequency of a carrier wave so that the specific frequency matches with a harmonic component of the frequency of the carrier wave.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIGS. 13A-13C show a specific example of the change in the carrier frequency with respect to time changed by the carrier frequency changing unit shown in FIG. 10;

FIGS. 19A-19G are an explanatory diagram of a harmonic spectrum that occurs due to the change in the carrier frequency with respect to time shown in FIG. 18;

FIGS. 21A-21C are explanatory diagrams of the change in the carrier frequency with respect to time changed by the carrier frequency changing unit and the harmonic spectrum shown in FIG. 20;

FIG. 25 is an explanatory diagram of a configuration of a repetitive signal generation device;

DETAILED DESCRIPTION OF THE PREFERRED EMBODIMENTS

As a power conversion control apparatus according to the present invention, as an example, there is explained a power conversion control apparatus that includes an inverter circuit that supplies sinusoidal alternating-current power to a motor by subjecting an output of a direct-current power supply to pulse-width modulation. A power conversion control apparatus according to first to fifth embodiments of the present invention will be explained below with reference to FIG. 1 to FIG. 24.

First Embodiment

The power conversion control apparatus according to the first embodiment is explained with reference to FIGS. 1 to 8F.

(Configuration of Control Device in Power Conversion Control Apparatus)

Figure 1:
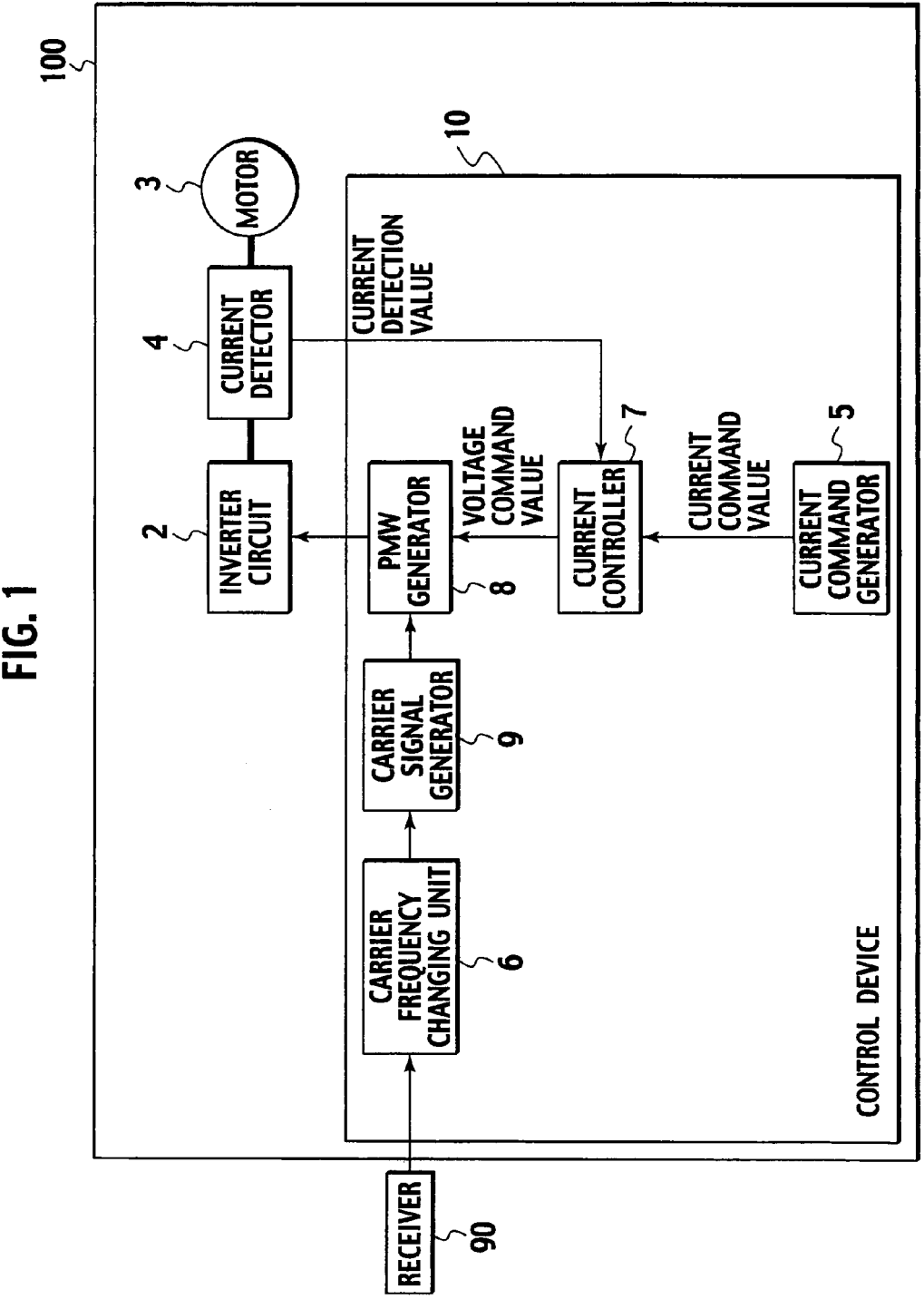
FIG. 1 is an explanatory diagram of a configuration of an inverter system according to a first embodiment of the present invention.

FIG. 1 is an explanatory diagram of a configuration of an inverter system 100 according to the first embodiment. The inverter system 100, which corresponds to the power conversion control apparatus according to the first embodiment, includes an inverter circuit 2, a motor 3, a current detector 4, and a control device 10. The control device 10 includes a current command generator 5, which corresponds to a command value output unit in the appended claims, a carrier frequency changing unit 6, which corresponds to a frequency changing unit in the appended claims, a current controller 7, a PWM generator 8, which corresponds to a control signal generating unit in the appended claims, a carrier signal generator 9, which corresponds to a carrier wave output unit in the appended claims, and a target frequency setting unit 11, which corresponds to a frequency setting unit in the appended claims. A receiver 90 such as a radio is placed near the inverter system 100.

The current controller 7 performs an arithmetic operation of a current command value from the current command generator 5 and a current detection value from the current detector 4 and outputs a voltage command value to the PMW generator 8. The carrier frequency changing unit 6 changes a frequency (hereinafter, "carrier frequency") f of a carrier signal (see FIG. 4 (described later)) output from the carrier signal generator 9 with respect to time. The carrier signal generator 9 generates a triangular carrier signal having the carrier frequency f and outputs the carrier signal to the PMW generator 8. The PMW generator 8 makes a PWM comparison based on the voltage command value from the current controller 7 and the carrier signal and outputs ON, OFF signals, namely control signals, to the inverter circuit 2. The inverter circuit 2 supplies electric power to the motor 3 by turning on/off a switching device (see FIG. 5 (described later)), which is an output unit incorporated in the inverter circuit 2, based on the ON, OFF signals (PWM pattern) output from the PMW generator 8.

Figure 2:
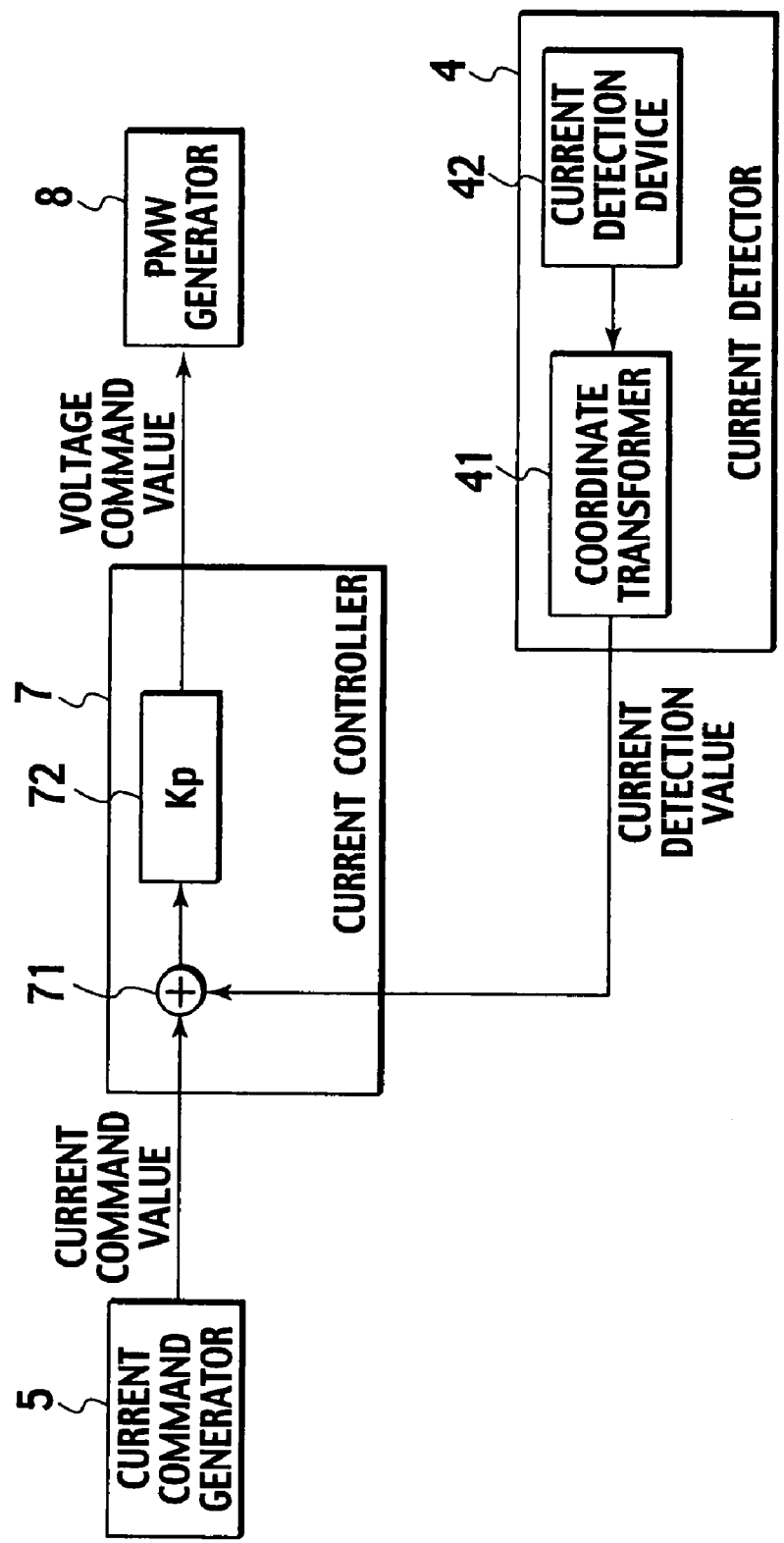
FIG. 2 is an explanatory diagram of a current controller shown in FIG. 1.

FIG. 2 is an explanatory diagram of the current controller 7 shown in FIG. 1. The current controller 7 includes an operation unit 71 that performs an arithmetic operation of the deviation between the current command value from the current command generator 5 and the current detection value from the current detector 4 and a proportion controller 72 that controls the result of the arithmetic operation by the operation unit 71 in a proportional manner (P control) and outputs the voltage command value to the PMW generator 8. The current detector 4 includes a coordinate transformer 41 and a current detection device 42. The current detection device 42 consists of three current sensors 42a, 42b, and 42c (see FIG. 5 (described later)) that detect current values of U-phase, V-phase, and W-phase supplied to the motor 3 from the inverter circuit 2. The coordinate transformer 41 transforms the detected current value into a current value having a d-axis coordinate and a q-axis coordinate (current detection value). In other words, the current detection value is a current value having been subjected to the three-phase/two-phase coordinate transformation. After the transformation, the current detection value is output to the operation unit 71 of the current controller 7.

Figure 3:
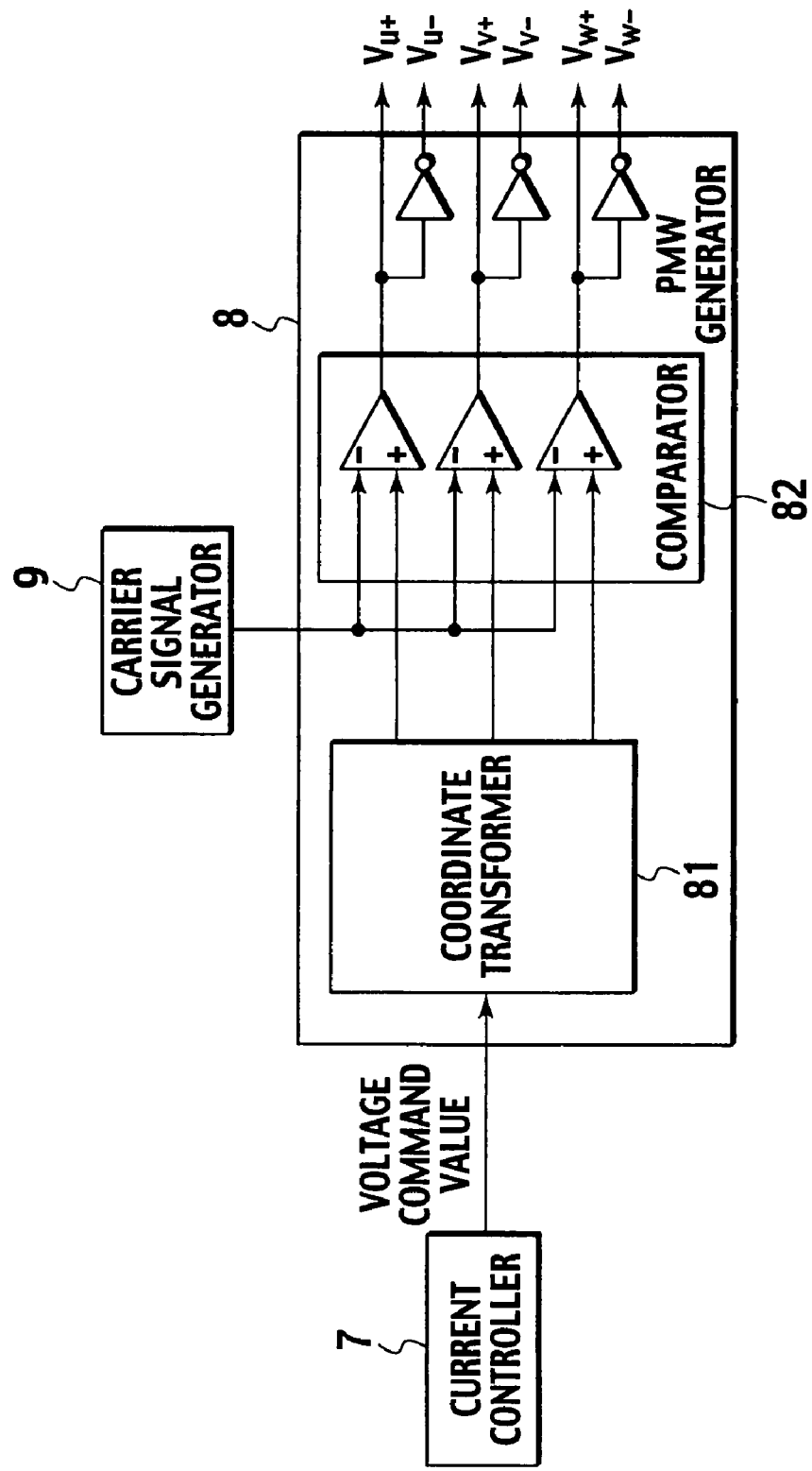
FIG. 3 is an explanatory diagram of a PWM generator shown in FIG. 1.

FIG. 3 is an explanatory diagram of the PMW generator 8 shown in FIG. 1. The PMW generator 8 includes a coordinate transformer 81 that performs two-phase/three-phase coordinate transformation of a voltage command value output from the current controller 7 having a d-axis coordinate and a q-axis coordinate into a value having U-phase, V-phase, and W-phase, and a comparator 82 that compares the value having subjected to the coordinate transformation (voltage command value) with a carrier signal from the carrier signal generator 9. The comparator 82 outputs the ON, OFF signal to the inverter circuit 2 according to the relationship in magnitude between the voltage command value and the carrier signal. The frequency of the ON, OFF signal is the same as the carrier frequency f.

Figure 4:
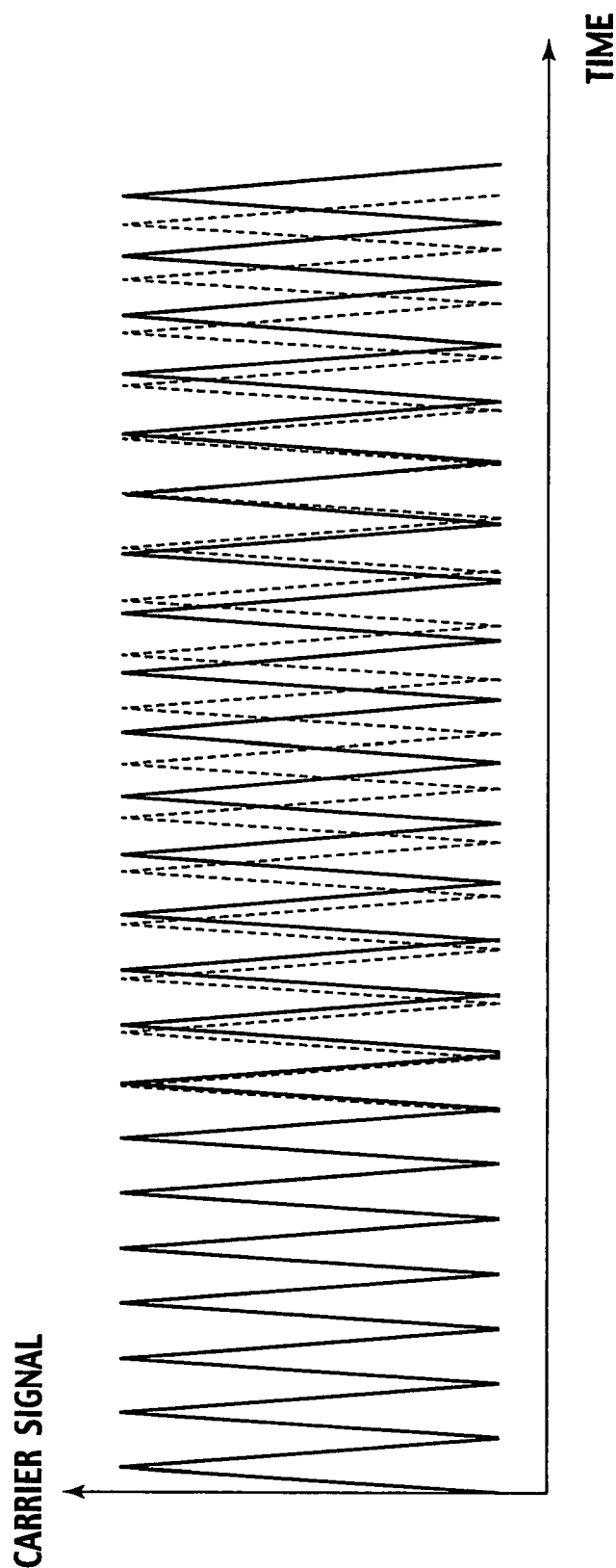
FIG. 4 is an explanatory diagram of a carrier signal output from a carrier signal generator shown in FIG. 1.

FIG. 4 is an explanatory diagram of a carrier signal output from the carrier signal generator 9 shown in FIG. 1. The carrier signal is a triangular wave and when the carrier frequency f is constant, the intervals between peaks are constant (indicated by a dotted line). The carrier frequency f changed with respect to time is indicated by a solid line.

Figure 5:
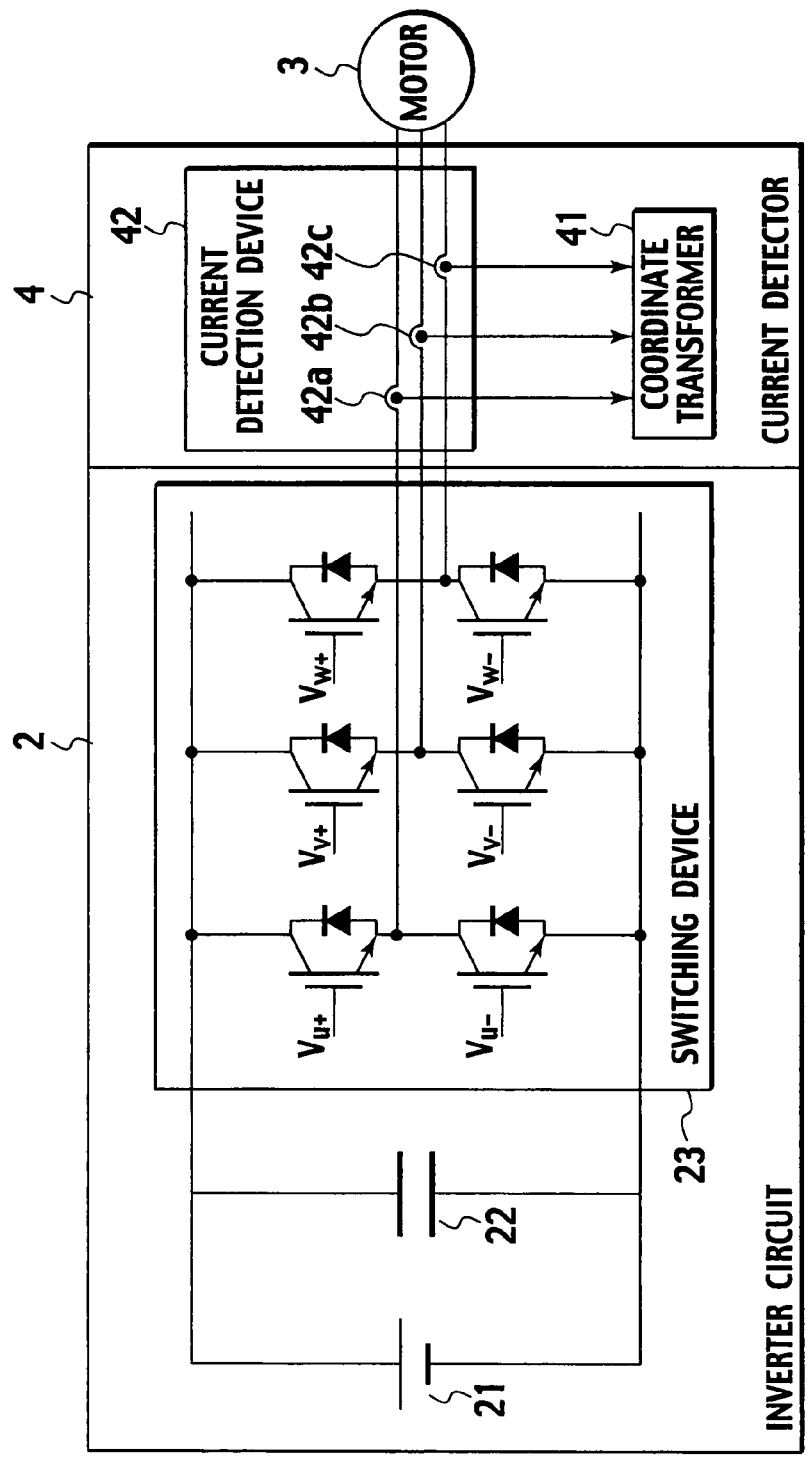
FIG. 5 is an explanatory diagram of an inverter circuit shown in FIG. 1.

FIG. 5 is an explanatory diagram of the inverter circuit 2 shown in FIG. 1. The inverter circuit 2 includes a battery 21, a capacitor 22, and the six switching devices 23. The six switching devices 23 are each composed of a semiconductor device such as an IGBT (Insulated Gate Bipolar Transistor). The current detector 4 is constituted by the current detection device 42 consisting of the current sensors 42a, 42b, and 42c that detect current values of U-phase, V-phase, and W-phase supplied to the motor 3 from the inverter circuit 2 and the coordinate transformer 41 that performs coordinate transformation of the current value detected by the current detection device 42. The six switching devices 23 select a positive electrode or a negative electrode of a direct current power supply consisting of the battery 21 and the capacitor 22 according to the ON, OFF signal of the comparator 82, then electrically connects the selected electrode with each electrode of U-phase, V-phase, and W-phase of the motor 3, and supplies electric power to the motor 3.

(Values of Carrier Frequency)

The carrier frequency changing unit 6 sets the target frequency ft based on the channel frequency fch of the receiver 90 and determines each value fmq (mq: integer, q=1, 2, ..., r) of the carrier frequency f. The configuration of the carrier frequency changing unit 6 is explained below.

Figure 6:
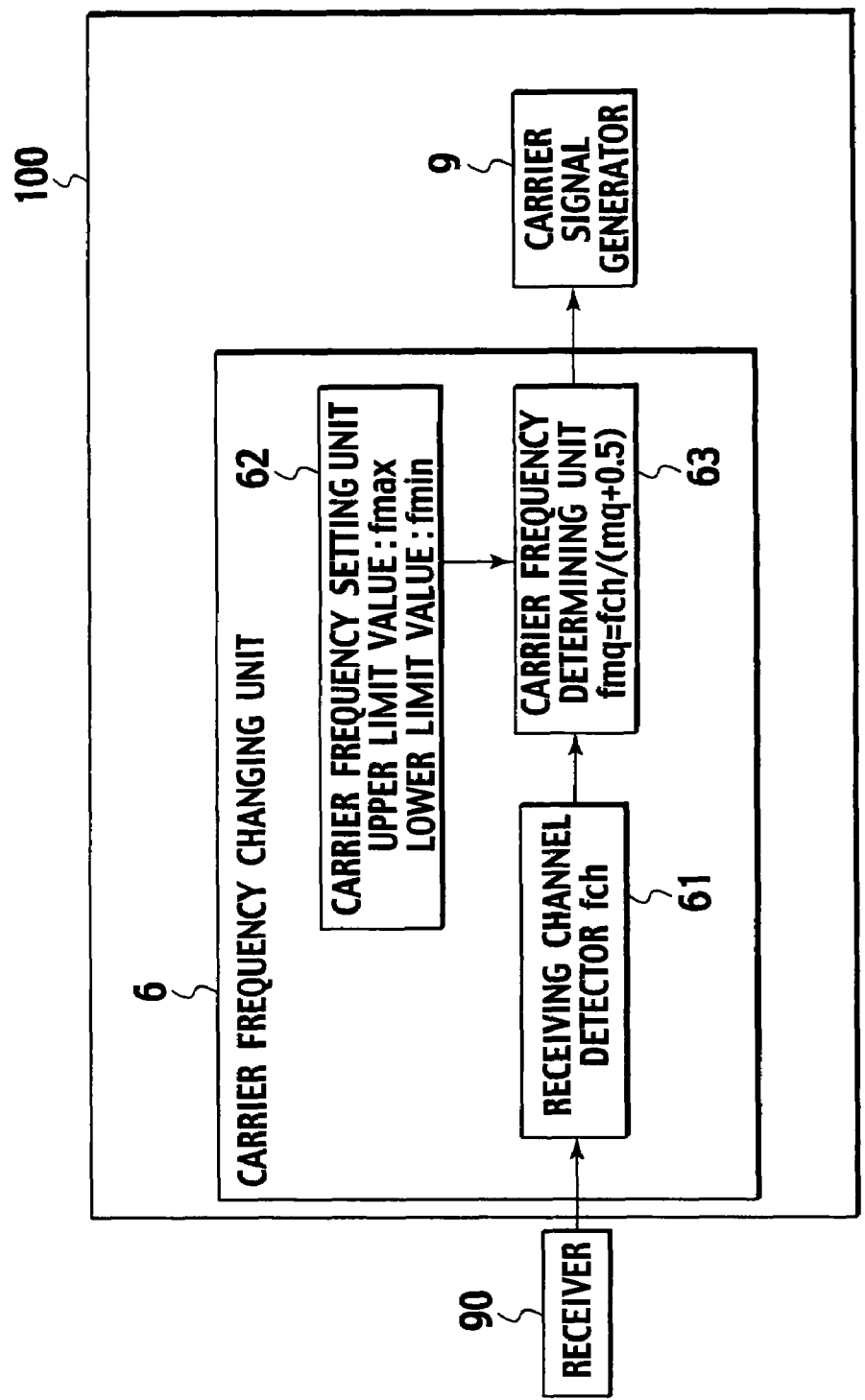
FIG. 6 is an explanatory diagram of a configuration of the carrier frequency changing unit shown in FIG. 1.
Figure 7:
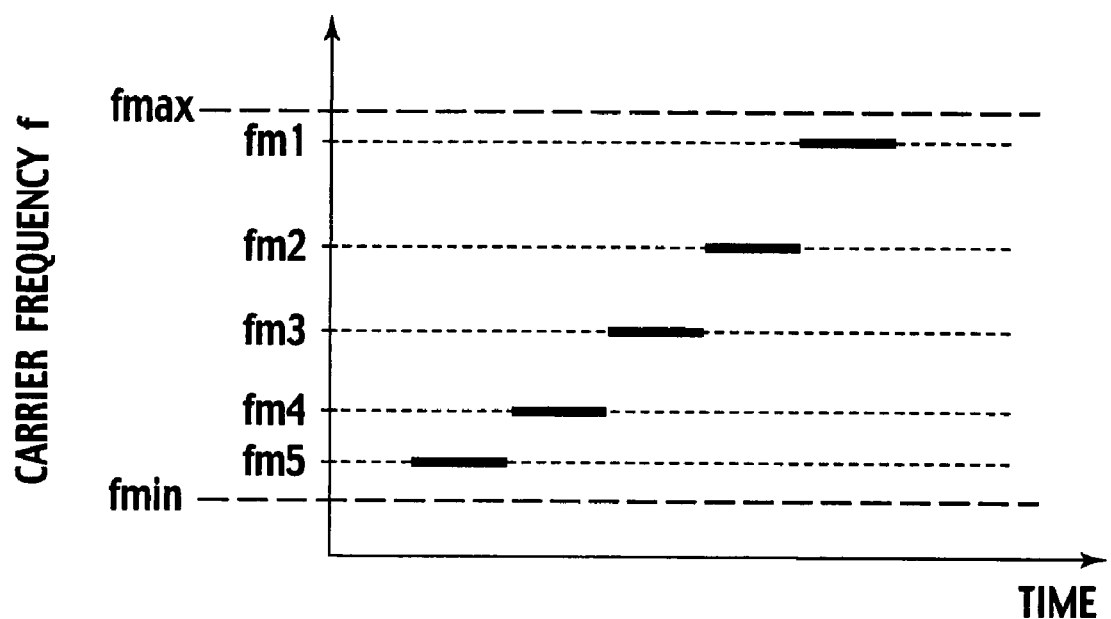
FIG. 7 is an explanatory diagram of a change in a carrier frequency with respect to time changed by a carrier frequency changing unit shown in FIG. 6.

FIG. 6 is an explanatory diagram of a configuration of the carrier frequency changing unit 6 shown in FIG. 1, and FIG. 7 is an explanatory diagram of a change in the carrier frequency f with respect to time changed by the carrier frequency changing unit 6 shown in FIG. 6. As shown in FIG. 6, the carrier frequency changing unit 6 includes a receiving channel detector 61 that detects the channel frequency fch of the receiver 90 and sets the detected channel frequency fch as the target frequency ft, a carrier frequency setting unit 62 that sets the upper limit value fmax and the lower limit value fmin, and a carrier frequency determining unit 63 that determines each value fmq of the carrier frequency f from the target frequency ft, the upper limit value fmax, and the lower limit value fmin. The upper limit value fmax and the lower limit value fmin are determined depending on the switching element 23 and the device. Specifically, as shown in FIG. 7, the carrier frequency determining unit 63 divides the target frequency ft=channel frequency fch by the integer mq+0.5 and among the divided values, those included in the range between the lower limit value fmin and the upper limit value fmax are taken as each of the values fm1, ..., and fm5 of the carrier frequency f. The carrier frequency changing unit 6 then changes the carrier frequency f with respect to time based on each of the values fm1, ..., and fm5 of the carrier frequency f.

Figure 8A:
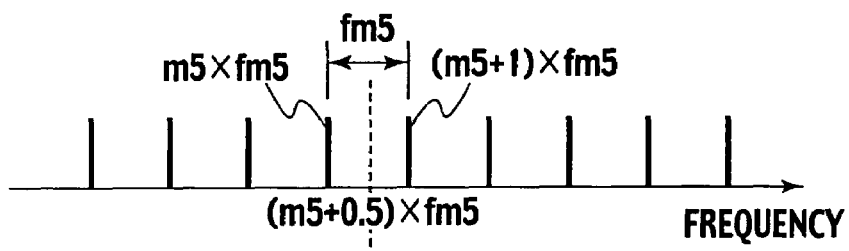
FIGS. 8A-8F are an explanatory diagram of a harmonic spectrum that occurs due to the change in the carrier frequency with respect to time shown in FIG. 7.
Figure 8B:
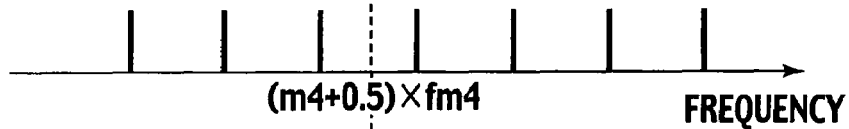
Figure 8C:
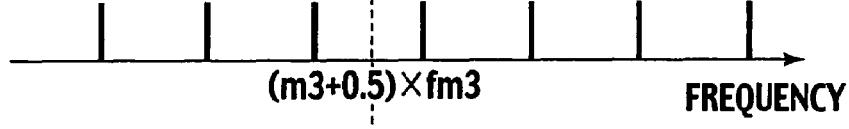
Figure 8D:
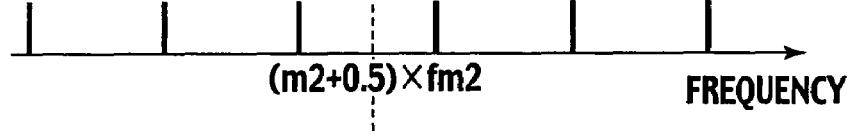
Figure 8E:
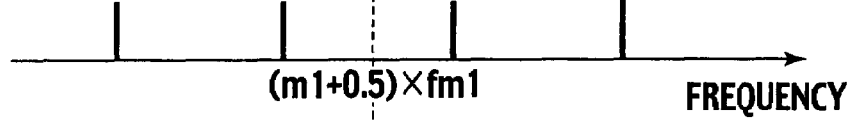
Figure 8F:
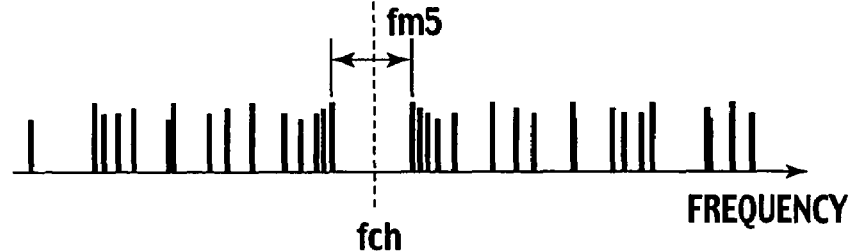

FIGS. 8A-8F are an explanatory diagram of the harmonic spectrum that occurs due to the change in the carrier frequency f with respect to time shown in FIG. 7. FIG. 8A shows a noise spectrum that occurs in the frequency n×fm5 of the n-th harmonic of the value fm5 of the carrier frequency f, FIG. 8B shows a noise spectrum that occurs in the frequency n×fm4 of the n-th harmonic of the value fm4 of the carrier frequency f, FIG. 8C shows a noise spectrum that occurs in the frequency n×fm3 of the n-th harmonic of the value fm3 of the carrier frequency f, FIG. 8D shows a noise spectrum that occurs in the frequency n×fm2 of the n-th harmonic of the value fm2 of the carrier frequency f, and FIG. 8E shows a noise spectrum that occurs in the frequency n×fm1 of the n-th harmonic of the value fm1 of the carrier frequency f. In addition, FIG. 8F shows a spectrum in which the noise spectra that occur in the frequency of the n-th harmonic of each of the values fm1, fm2, fm3, fm4, and fm5 are overlapped.

As shown in FIG. 8F, the channel frequency fch is equal to (mq+0.5)×fmq, that is, (m1+0.5)×fm1, . . . , and (m5+0.5)×fm5. No noise spectrum occurs in the frequency band more than the frequency mq×fmq of the mq-th harmonic of the carrier frequency f and less than the frequency (mq+1)×fmq of the (mq+1)-th harmonic. As a result, as shown in FIG. 8F, even in the case where the noise spectra that occur in the frequency of the n-th harmonic of each of the values fm1, . . . , and fm5 of the carrier frequency f are overlapped, no noise spectrum occurs in the frequency band more than the frequency m5×fm5 of the m5-th harmonic, which is the minimum value fa of each of the values fm1, . . . , and fm5 of the carrier frequency f and less than the frequency (m5+1)×fm5 of the (m5+1)-th harmonic. Since no noise spectrum occurs in the channel frequency fch, the noise level of the channel frequency fch can be reduced.

As described above, in the inverter system 100 according to the first embodiment, each value fmq of the carrier frequency f is calculated so that the frequency mq×fmq of the mq-th harmonic in each value fmq of the carrier frequency f matches with the specific frequency fs calculated by the target frequency ft-the minimum value fa/2, which is the channel frequency fch. Specifically, the channel frequency fch is divided by the integer mq+0.5 and among the divided values, those included in the range between the lower limit value fmin and the upper limit value fmaz are taken as each of the values fm1, . . . , and fm5 of the carrier frequency f so that the channel frequency fch is included in the frequency band more than the frequency mq×fmq of the mq-th harmonic in each value fmq of the carrier frequency f and less than the frequency (mq+1)×fmq of the (mq+1)-th harmonic, that is, in the frequency band more than the frequency m5×fm5 of the m5-th harmonic of fm5, which is the minimum value fa of each of the values fm1, . . . , and fm5 of the carrier frequency f and less than the frequency (m5+1)×fm5 of the (m5+1)-th harmonic. Because of this, since the noise spectrum, which would occur in the frequency n×fmq of the n-th harmonic in each value fmq of the carrier frequency f, does not appear in the frequency band more than m5×fm5 including the channel frequency fch, which is the desired target frequency ft, and less than (m5+1)×fm5, it is possible to reduce the noise level in the frequency band more than m5×fm5 and less than (m5+1)×fm5 including the desired target frequency ft more than the noise level when the EMI noises that occur owing to the opening/closing of the switching element 23 are diffused evenly in the frequency band between n×fm1 and n×fm5 of the n-th harmonic including the frequency band more than m5×fm5 and less than (m5+1)×fm5 in the values fm1 to fm5 of the carrier frequency f.

The sum of energy of the electromagnetic noises remains the same regardless of diffusion, and therefore, there used be a problem in that it is not possible to reduce the electromagnetic noises below a predetermined value only by changing the carrier wave frequency discretely at a constant cycle.

Second Embodiment

An inverter system 200 according to the second embodiment is explained next with reference to FIG. 9 to FIG. 16 with points different from those of the inverter system 100 according to the first embodiment as the central points. Like configurations in the inverter system 200 according to the second embodiment as those in the inverter system 100 according to the first embodiment are denoted by like reference numerals, and explanations thereof will be omitted. The configuration of the inverter system 200 according to the second embodiment is almost the same as that of the inverter system 100 according to the first embodiment. The inverter system 200 according to the second embodiment differs from the first embodiment only in that a carrier frequency changing unit 24 in a control device 20 is different.

Figure 9:
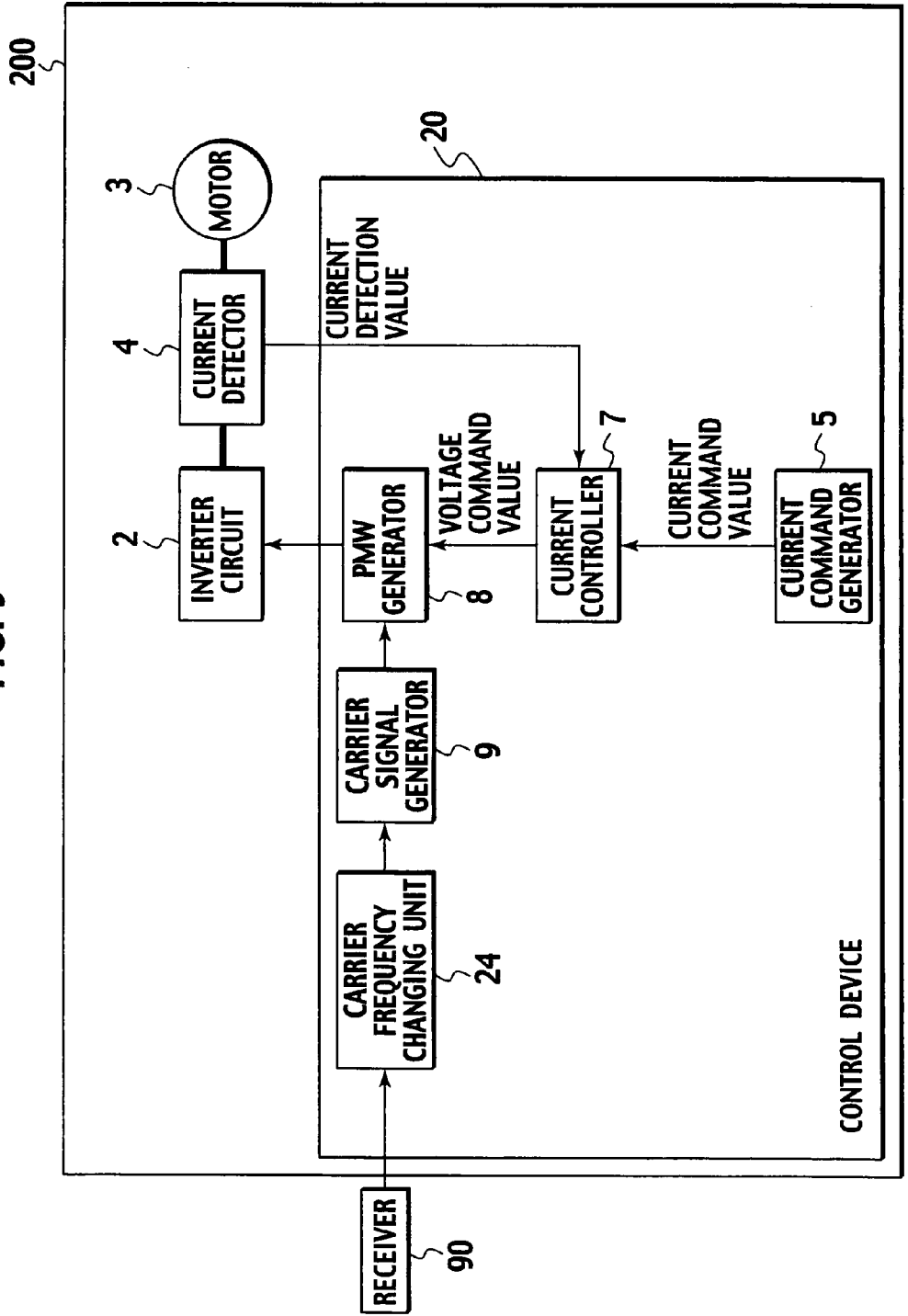
FIG. 9 is an explanatory diagram of a configuration of an inverter system according to a second embodiment of the present invention.

FIG. 9 is an explanatory diagram of a configuration of the inverter system 200 according to the second embodiment. As shown in FIG. 9, in the second embodiment, a receiver 90, such as a radio is placed near the inverter system 200, which corresponds to the power conversion control apparatus in the appended claims, as in the first embodiment. The carrier frequency changing unit 24, which corresponds to the frequency changing unit in the appended claims, sets the target frequency ft based on the channel frequency fch of the receiver 90 and determines each value fmq of the carrier frequency f from the target frequency ft and the channel band BAND of the receiver 90. The configuration of the carrier frequency changing unit 24 is explained below.

Figure 10:
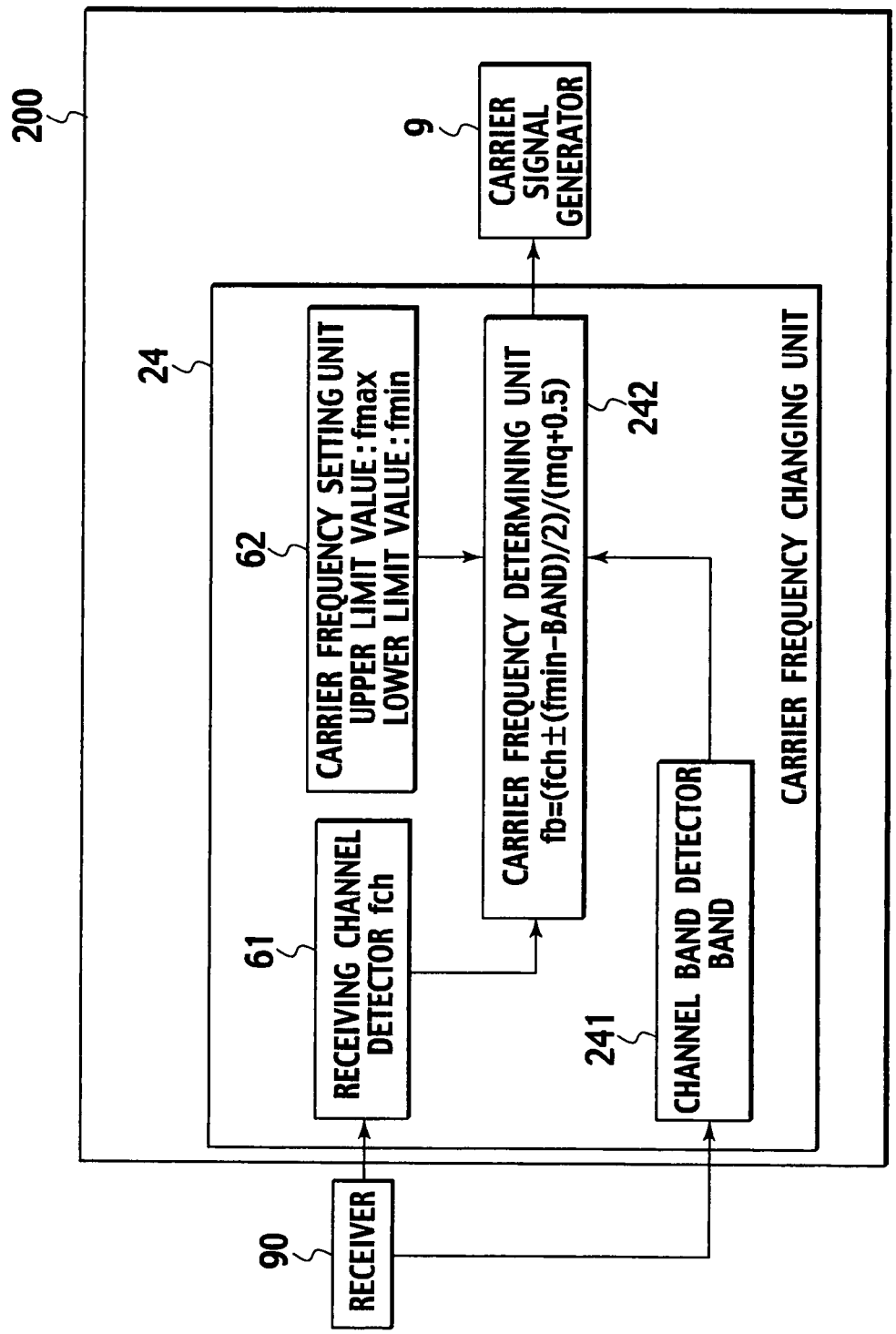
FIG. 10 is an explanatory diagram of a configuration of a carrier frequency changing unit shown in FIG. 9.

FIG. 10 is an explanatory diagram of the configuration of the carrier frequency changing unit 24 shown in FIG. 9. As shown in FIG. 10, the carrier frequency changing unit 24 includes the receiving channel detector 61 that detects the channel frequency fch of the receiver 90 and sets the detected channel frequency fch as the target frequency ft, the carrier frequency setting unit 62 that sets the upper limit value fmax and the lower limit value fmin, a channel band detector 241, which corresponds to a channel band detecting unit in the appended claims that detects the channel band (see FIG. 11) of the receiver 90, and a carrier frequency determining unit 242 that determines each value fmq of the carrier frequency f from the target frequency ft, the channel band BAND, the upper limit value fmax, and the lower limit value fmin. The upper limit value fmax and the lower limit value fmin are determined depending on the switching device 23 and the device. Specifically, the carrier frequency determining unit 242 sets values included in the range between the lower limit value fmin and the upper limit value fmax among values fb calculated by fb=(fch±(fmin−BAND)/2)/(mq+0.5) using the target frequency ft, the channel band BAND, the lower limit fmin, and the integer mq, as shown in FIG. 10. The carrier frequency changing unit 24 then changes the carrier frequency f based on each value fmq of the carrier frequency f. Due to this, the inverter 200 according to the second embodiment also calculates each value fmq of the carrier frequency f so that the frequency mq×fmq of the mq-th harmonic in each value fmq of the carrier frequency f matches with the specific frequency fs calculated from the target frequency ft−BAND/2, which is the channel frequency fch. Therefore, the same effect as that in the first embodiment can be obtained.

Figure 11:
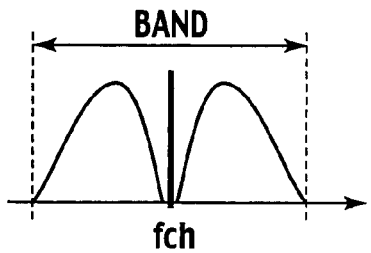
FIG. 11 shows the channel frequency and the channel band of the receiver shown in FIG. 9.
Figure 12A:
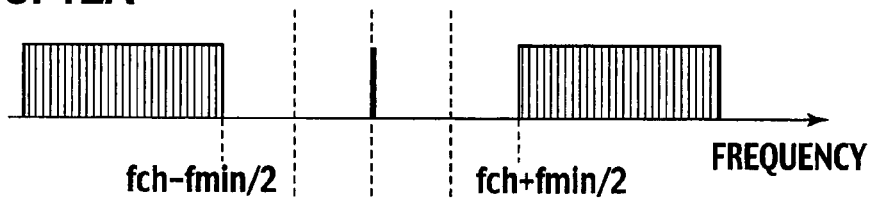
FIGS. 12A-12D are an explanatory diagram of the change in the carrier frequency with respect to time changed by the carrier frequency changing unit and the harmonic spectrum shown in FIG. 10.
Figure 12B:
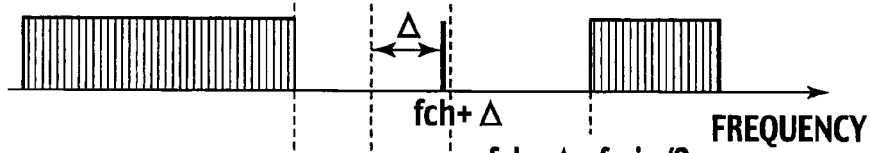
Figure 12C:
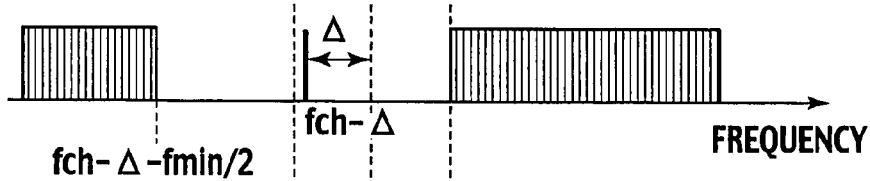
Figure 12D:
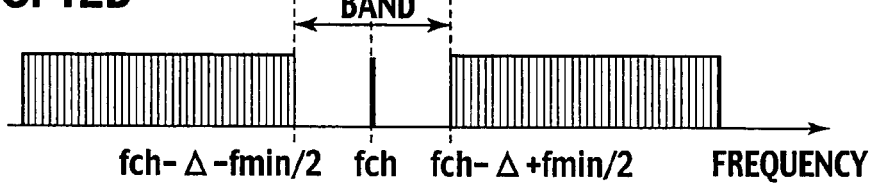

FIGS. 11, 12A-12D are an explanatory diagram of a harmonic spectrum that occurs due to the change in the carrier frequency f with respect to time changed by the carrier frequency changing unit 24 shown in FIG. 10. FIG. 11 shows the channel frequency fch and the channel band BAND of the receiver 90. FIG. 12A shows a noise spectrum averaged with respect to time when the channel frequency fch is divided by mq+0.5. FIG. 12B shows a nose spectrum averaged with respect to time when fch+Δ is divided by mq+0.5 and FIG. 12C shows a noise spectrum averaged with respect to time when fch−Δ is divided by mq+0.5. FIG. 12D shows a noise spectrum, in which the noise spectrum averaged with respect to time in FIG. 12A, the noise spectrum averaged with respect to time in FIG. 12B, and the noise spectrum averaged with respect to time in FIG. 12C are overlapped. The minimum value fa of each value fmq of the carrier frequency f is set equal to the lower limit value fmin. Δ=(fmin−BAND)/2 holds. As shown in FIGS. 12A-12D, the frequency band in which no noise spectrum appears, that is, the frequency band between fch+Δ−fmin/2 and fch−Δ+fmin/2 is equal to the channel band BAND. As a result, the noise level in the channel band BAND of the receiver 90 can be reduced.

Figures 13A, 13B:
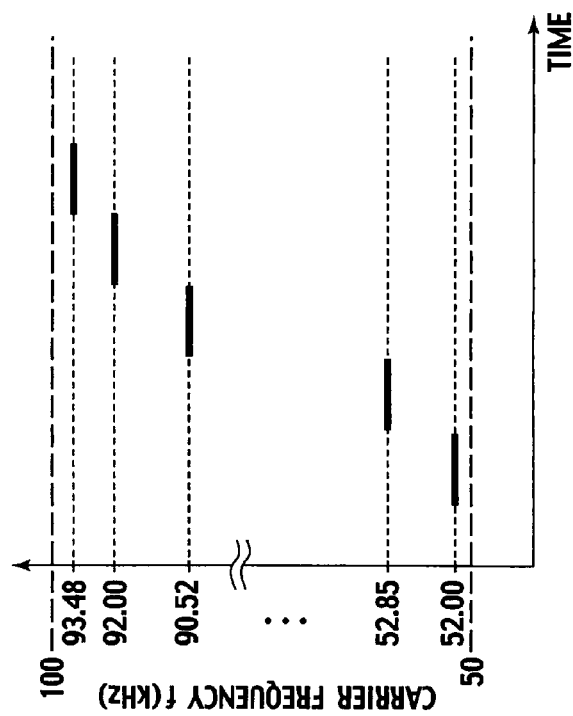

FIGS. 13A-13C show a specific example of the change in the carrier frequency f with respect to time changed by the carrier frequency changing unit 24 shown in FIG. 10. FIGS. 13A,B show each value fmq of the carrier frequency f when the receiver 90 is a radio, the received channel is Nippon Broadcasting System, the upper limit value is 100 kHz, the lower limit value is 50 kHz, the channel band BAND is 10 kHz, and the integer mq is between 13 and 23. Although, the channel band BAND in Japan is 9 kHz and the channel band BAND in USA is 10 kHz, for simplicity of explanation, the channel band BAND=10 kHz in USA is used here. In this case, A is equal to 20 kHz as shown in FIGS. 13A,B. In FIGS. 13A,B, (a) is a value obtained by dividing fch−Δ=1242 kHz−20 kHz=1222 kHz by (mq+0.5). (b) is a value obtained by dividing fch=1242 kHz by (mq+0.5). (c) is a value obtained by dividing fch+Δ=1242 kHz+20 kHz=1262 kHz by (mq+0.5). In addition, values included in the range between the lower limit value fmin and the upper limit value fmaz among the values calculated by (a), (b), and (c) are taken as each value fmq of the carrier frequency f. In this case, the integer mq is 13 to 23. FIG. 13C shows the change in the carrier frequency f with respect to time changed at each value fmq of the carrier frequency f shown in FIGS. 13A,B. In FIG. 13C, all of the values are used, that is, each value fmq of the carrier frequency f calculated in FIGS. 13A,B is used in the ascending order.

Figure 14:
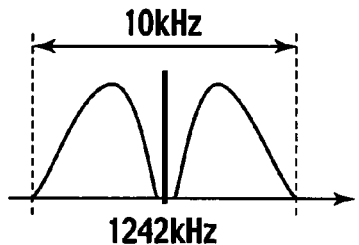
FIG. 14 shows the channel frequency and the channel band of the receiver shown in FIG. 9.
Figure 15A:
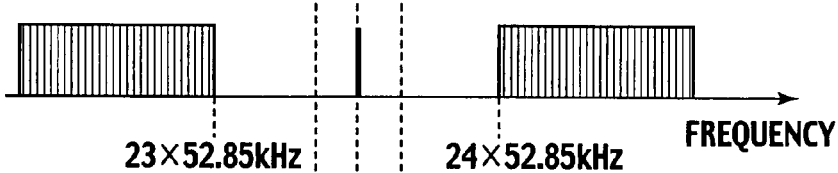
FIGS. 15A-15D show harmonic spectra that occur due to the change in the carrier frequency with respect to time shown in FIG. 13C.
Figure 15B:
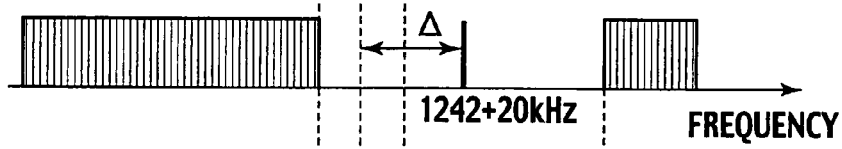
Figure 15C:
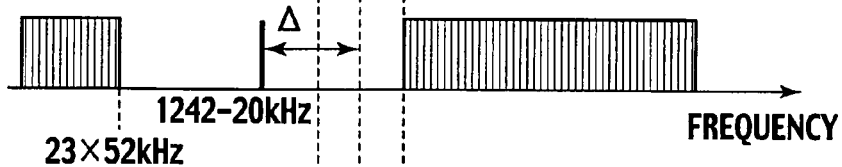
Figure 15D:
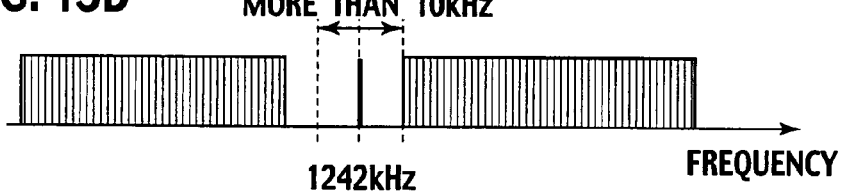

FIGS. 14,15A-15D shows a harmonic spectrum that occurs due to the change in the carrier frequency f with respect to time shown in FIG. 13C. FIG. 14 shows the channel frequency fch=1242 kHz and the channel band BAND=10 kHz of the receiver 90. FIG. 15A shows a noise spectrum averaged with respect to time when the spectrum is calculated using (b) shown in FIGS. 13A,B. FIG. 15B shows a noise spectrum averaged with respect to time when the spectrum is calculated using (c) shown in FIGS. 13A,B and FIG. 15C shows a noise spectrum averaged with respect to time when the spectrum is calculated using (a) shown in FIGS. 13A,B. FIG. 15D shows a noise spectrum, in which the noise spectrum averaged with respect to time in FIG. 15A, the noise spectrum averaged with respect to time in FIG. 15B, and the noise spectrum averaged with respect to time in FIG. 15C are overlapped. As shown in FIG. 15C, no noise spectrum appears in the frequency range more than the frequency 23×53.7 kHz of the twenty-third harmonic of the minimum value 53.70 kHz of the value fmq of the carrier frequency f calculated using (c) shown in FIGS. 13A,B and less than the frequency 24×52 kHz of the twenty-fourth harmonic of the minimum value 52.00 kHz of the value fmq of the carrier frequency f calculated using (a) shown in FIGS. 13A,B. The frequency band is then equal to or more than the channel band 10 kHz. As a result, the noise level in the channel band 10 kHz of the receiver 90 can be reduced.

Figure 16:
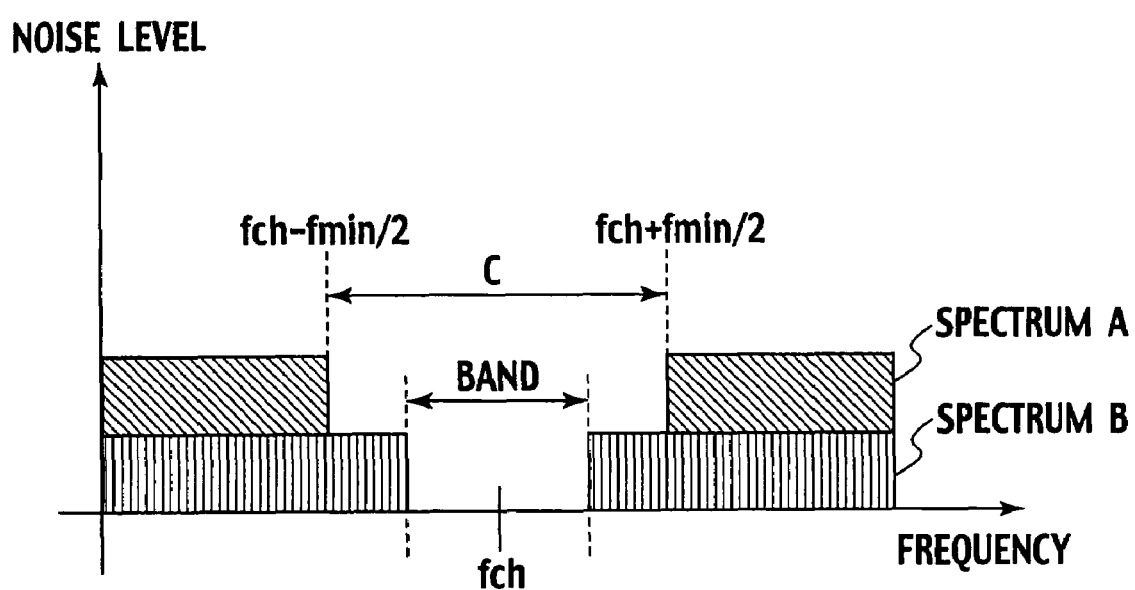
FIG. 16 shows a comparison between the harmonic spectrum in the first embodiment and the harmonic spectrum in the second embodiment.

FIG. 16 shows a comparison between the harmonic spectrum in the first embodiment and the harmonic spectrum in the second embodiment. In FIG. 16, the harmonic spectrum in the first embodiment is represented by spectrum A and the harmonic spectrum in the second embodiment is represented by spectrum B. A case is explained here, in which the minimum value fa=lower limit value fmin of each value fmq of the carrier frequency f is greater compared to the channel band BAND of the receiver 90. In the spectrum A, since no noise spectrum appears in a wider frequency band compared to the channel band BAND, that is, in a frequency band C more than fch−fmin/2 and less than fch+fmin/2, the noise level in the frequency band C can be reduced. Outside the frequency band C, however, the noise level is reduced by the even diffusion in the frequency band n×fmq of the n-th harmonic including the frequency band C at the value fmq of the carrier frequency f. Because of this, if the frequency band C becomes too wide, the frequency band n×fmq for even diffusion is eliminated and the noise level outside the frequency band C is increased, and there is the possibility that interference with other devices may occur. To prevent this, in the second embodiment, as represented by the spectrum B, the frequency band in which no noise spectrum appears is only the channel band BAND. As a result, since the noise level outside the channel band can be reduced, the impact on other devices can also be reduced.

Third Embodiment

An inverter system 300 according to the third embodiment is explained next with reference to FIG. 17 to FIG. 19G with points different from those of the inverter system 100 according to the first embodiment as the central points. Like configurations in the inverter system 300 according to the third embodiment as those in the inverter system 100 according to the first embodiment are denoted by like reference numerals, and explanations thereof will be omitted. The configuration of the inverter system 300 according to the third embodiment is almost the same as that of the inverter system 100 according to the first embodiment. The inverter system 300 according to the third embodiment differs from the first embodiment only in that a carrier frequency changing unit 32 in a control device 30 is different.

Figure 17:
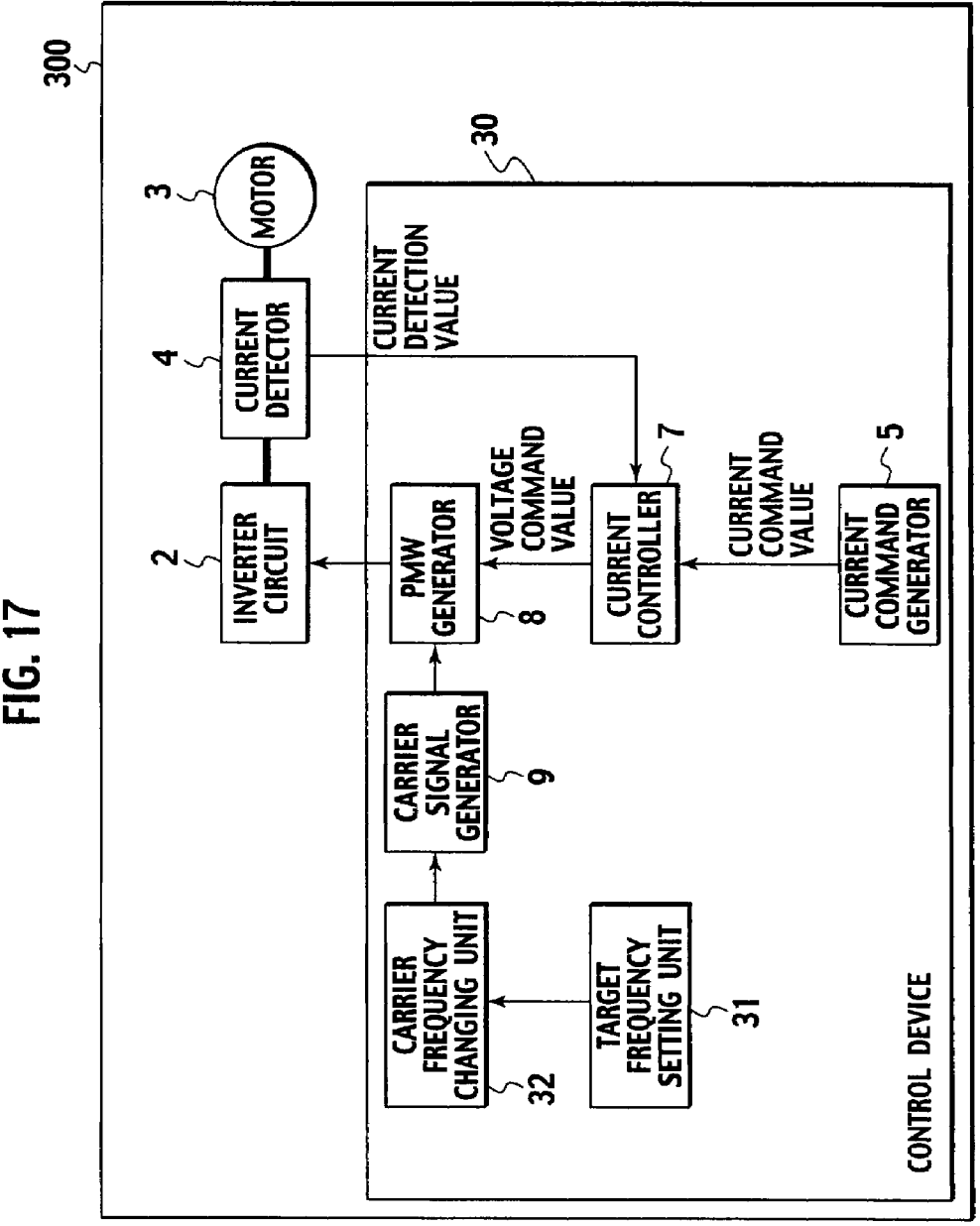
FIG. 17 is an explanatory diagram of a configuration of an inverter system according to a third embodiment of the present invention.
Figure 18:
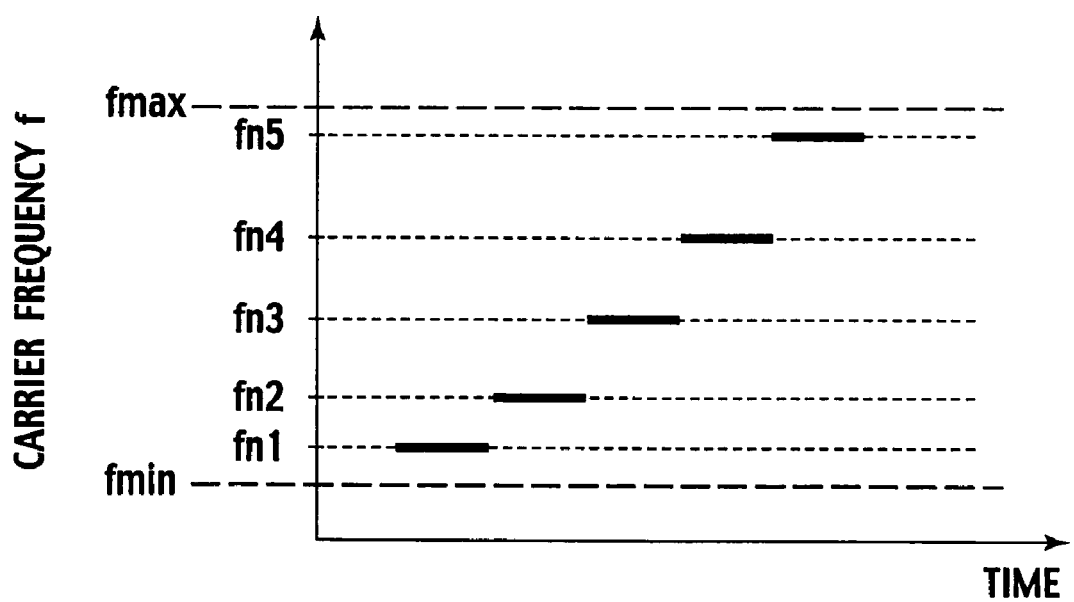
FIG. 18 is an explanatory diagram of a change in a carrier frequency with respect to time changed by a carrier frequency changing unit shown in FIG. 17.

FIG. 18 is an explanatory diagram of the change in the carrier frequency f with respect to time changed by the carrier frequency changing unit 32 shown in FIG. 17. As shown in FIG. 18, since the carrier frequency changing unit 32 changes the carrier frequency f with respect to time by digital control, only each of discrete values of the carrier frequency f can be used. As shown in FIG. 18, in many cases, there are set a maximum value fmax of the carrier frequency f that can be set (hereinafter, "upper limit value") and a minimum value fmin of the carrier frequency f that can be set (hereinafter, "lower limit value"). Because of this, only by changing the carrier frequency f with respect to time between the lower limit fmin and the upper limit fmax, it is not possible to reduce the noise level in a desired frequency band than the noise level when EMI noises that occur owing to the opening/closing of the switching device 23 are diffused evenly in the frequency band between n×fmin and n×fmax of the n-th (n: 1, 2, . . . ) harmonic including the desired frequency band between the lower limit value fmin and the upper limit value fmax of the carrier frequency f. The upper limit value fmax and the lower limit value fmin are determined depending on the switching device 23 and the device.

In the inverter system 300 according to the third embodiment, in order for the frequency nq×fnq of the nq-th harmonic in each of the values fnq (nq: natural number, q: 1, 2, . . . , r)

of the carrier frequency f to match with a value (hereinafter, "specific frequency") fs, which is a desired frequency (hereinafter, "target frequency") ft the noise level of which needs to be reduced plus a predetermined value p, to be described later, the specific frequency fs is divided by the natural number nq and values included in the range between the lower limit value fmin and the upper limit value fmax among the divided values are taken as each of the values fnq of the carrier frequency f. Due to this, since a noise spectrum, which would occur in the frequency n×fnq of the n-th harmonic in each of the values fnq of the carrier frequency f, does not appear in the desired target frequency ft, the noise level in the frequency band including the desired target frequency ft is more reduced than the noise level when the EMI noises that occur owing to the opening/closing of the switching device 23 are diffused evenly in the frequency band between n×fa and n×fb of the n-th harmonic including the desired target frequency ft in the range between the minimum value fa and the maximum value fb of each of the values fnq of the carrier frequency f.

To explain specifically, the target frequency setting unit 31 firstly sets the desired target frequency ft. After this, the target frequency setting unit 31 adds the predetermined value p (0<p<fmin) to the target frequency ft and calculates the specific frequency fs. The specific frequency fs is then divided by the natural number nq. Values included in the range between the lower limit value fmin and the upper limit value fmax among the divided values are taken as each of the values fn1, fn2, fn3, fn4, and fn5 of the carrier frequency f. The carrier frequency changing unit 32 changes the carrier frequency f with respect to time based on each of the values fn1, fn2, fn3, fn4, and fn5 of the carrier frequency f. Because of this, the frequency nq×fnq of the nq-th harmonic of each of the values fnq of the carrier frequency f, that is, the frequency n1×fn1 of the n1-th harmonic, . . . , and the frequency n5×fn5 of the n5-th harmonic will be the specific frequency fs. The noise spectrum that occurs in the frequency n1×fn1 of the n1-th harmonic, . . . , and the noise spectrum that occurs in the frequency n5×fn5 of the n5-th harmonic thus overlap at the specific frequency fs.

Figure 19A:
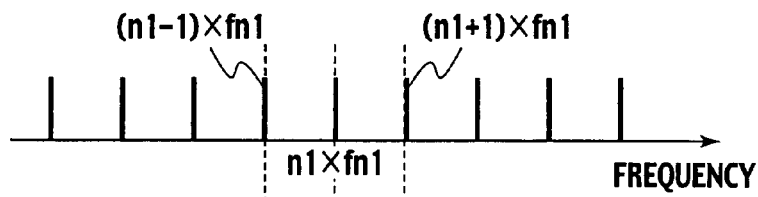
Figure 19C:
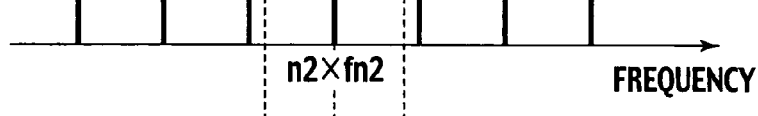
Figure 19D:
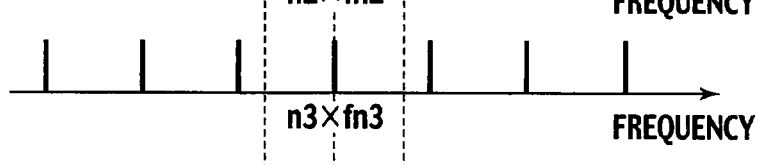
Figure 19E:
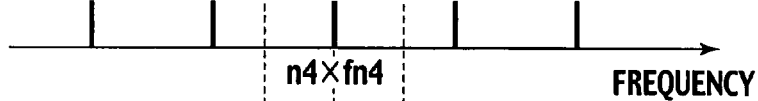
Figure 19F:
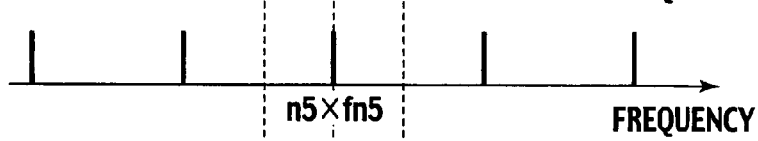
Figure 19G:

FIGS. 19A-19G are an explanatory diagram of the harmonic spectra that occurs due to the change in the carrier frequency with respect to time shown in FIG. 18. FIG. 19A shows a noise spectrum that occurs in the frequency n×fn1 of the n-th harmonic of the value fn1 of the carrier frequency f, FIG. 19B shows a noise spectrum that occurs in the frequency n×fn2 of the n-th harmonic of the value fn2 of the carrier frequency f, FIG. 19C shows a noise spectrum that occurs in the frequency n×fn3 of the n-th harmonic of the value fn3 of the carrier frequency f, FIG. 19D shows a noise spectrum that occurs in the frequency n×fn4 of the n-th harmonic of the value fn4 of the carrier frequency f, and FIG. 19E shows a noise spectrum that occurs in the frequency n×fn5 of the n-th harmonic of the value fn5 of the carrier frequency f. In addition, FIG. 19F shows a spectrum in which the noise spectra that occur in each of the values fn1, fn2, fn3, fn4, and fn5 of the carrier frequency f overlap and FIG. 19G shows the spectrum shown in FIG. 19F averaged with respect to time.

As shown in FIGS. 19A-19G, since the frequency n1×fn1 of the n1-th harmonic of the value fn1 of the carrier frequency f, . . . , and the frequency n5×fn5 of the n5-th harmonic of the carrier frequency f are equal to the specific frequency fs, the noise spectrum that occurs in the frequency n1×fn1 of the n1-th harmonic, . . . , and the noise spectrum that occurs in the frequency n5×fn5 of the n5-th harmonic overlap at the specific frequency fs. No noise spectrum occurs in the frequency band more than the frequency (nq−1)×fnq of the (nq−1)-th harmonic of the value fnq of the carrier frequency f and less than the frequency nq×fnq of the q-th harmonic. In the same manner, no noise spectrum occurs in the frequency band more than the frequency nq×fnq of the nq-th harmonic of the value fnq of the carrier frequency f and less than the frequency (nq+1)×fnq of the (nq+1)-th harmonic. As a result, as shown in FIG. 19F, even when the noise spectra that occur in the frequency of the n-th harmonic of each of the values fn1, . . . , and fn5 of the carrier frequency f are overlapped, no noise spectrum occurs in the frequency band more than the frequency (n1−1)×fn1 of the (n1−1)-th harmonic of fns1, which is the minimum value fa of each of the values fn1, fn5 of the carrier frequency f and less than the n1×fn1 of the n1-th harmonic. Even if averaged with respect to time as shown in FIG. 19G, no noise spectrum appears in the frequency band more than the frequency (n1−1)×fn1 of the (n1−1)-th harmonic and less than the frequency n1×fn1 of the n1-th harmonic. Because of this, the noise level in the frequency band more than the frequency (n1−1)×fn1 of the (n1−1)-th harmonic and less than the frequency n1×fn1 of the n1-th harmonic is more reduced than the noise level when diffused evenly in the frequency band between n×fn1 and n×fn5 of the n-th harmonic including the frequency band more than (n1−1)×fn1 and less than n1×fn1 in each of the values fn1 to fn5 of the carrier frequency f. In other words, it indicates that the noise level of the target frequency ft can be reduced by calculating each of the values fn1, . . . , and fn5 of the carrier frequency f so that the target frequency ft is included in the frequency band more than (n1−1)×fn1 and less than n1×fn1.

In the same manner, since no noise spectrum occurs in the frequency band more than the frequency n1×fn1 of n1-th harmonic of the value fn1 of the carrier frequency f and less than the frequency (n1+1)×fn1 of the (n1+1)-th harmonic, even if averaged with respect to time, no noise spectrum appears. As a result, the noise level in the frequency band more than the frequency n1×fn1 of the n1-th harmonic and less than the frequency (n1+1)×fn1 of the (n1+1)-th harmonic is more reduced than the noise level when diffused evenly in the frequency band between n×fn1 and n×fn5 including the frequency band more than n1×fn1 and less than (n1+1)×fn1 in each of the values fn1 to fn5 of the carrier frequency f. In other words, it is also indicated that the noise level of the target frequency ft can be reduced by calculating each of the values fn1, . . . , and fn5 of the carrier frequency f so that the target frequency ft is included in the frequency band more than n1×fn1 and less than (n1+1)×fn1 while assuming the predetermined value p to be fmin<p<2 fmin.

As described above, in the inverter system 300 according to the third embodiment, in order for the frequency nq×fnq of the nq-th harmonic in each value fnq of the carrier frequency f, that is, the frequency n1×fn1 of the n1-th harmonic, . . . , and the frequency n5×fn5 of the n5-th harmonic, to match with the specific frequency fs, the specific frequency fs is divided by the natural number nq and values included in the range between the lower limit value fmin and the upper limit value fmax among the divided values are taken as each of the values fn1, . . . , and fn5 of the carrier frequency f. Due to this, since the noise spectrum, which would occur in the frequency n×fnq of the n-th harmonic in each of the values fn1, . . . , and fn5 of the carrier frequency f, does not appear in the frequency band more than (n1−1)×fn1 and less than n1×fn1 including the desired target frequency ft, the noise level in the frequency band more than (n1−1)×fn1 and less than n1×fn1 including the desired target frequency ft can be more reduced than the noise level when the EMI noises that occur owing to the opening/closing of the switching device 23 are diffused evenly in the frequency band n×fns to fn1×fn5 of the n-th harmonic including the frequency range more than (n1−1)× fn1 and less than n1×fn1 in the values fn1 to fn5 of the carrier frequency f.

Fourth Embodiment

An inverter system 400 according to the fourth embodiment is explained below with reference to FIG. 20 and FIGS. 21A-21C with points different from those of the inverter system 300 according to the third embodiment as the central points. Like configurations in the inverter system 400 according to the fourth embodiment as those in the inverter system 300 according to the third embodiment are denoted by like reference numerals, and explanations thereof will be omitted. The configuration of the inverter system 400 according to the fourth embodiment is almost the same as that of the inverter system 300 according to the third embodiment. The inverter system 400 according to the fourth embodiment differs from the third embodiment only in that a control device 40 includes a receiving channel frequency detector 43 in place of the target frequency setting unit 31.

Figure 20:
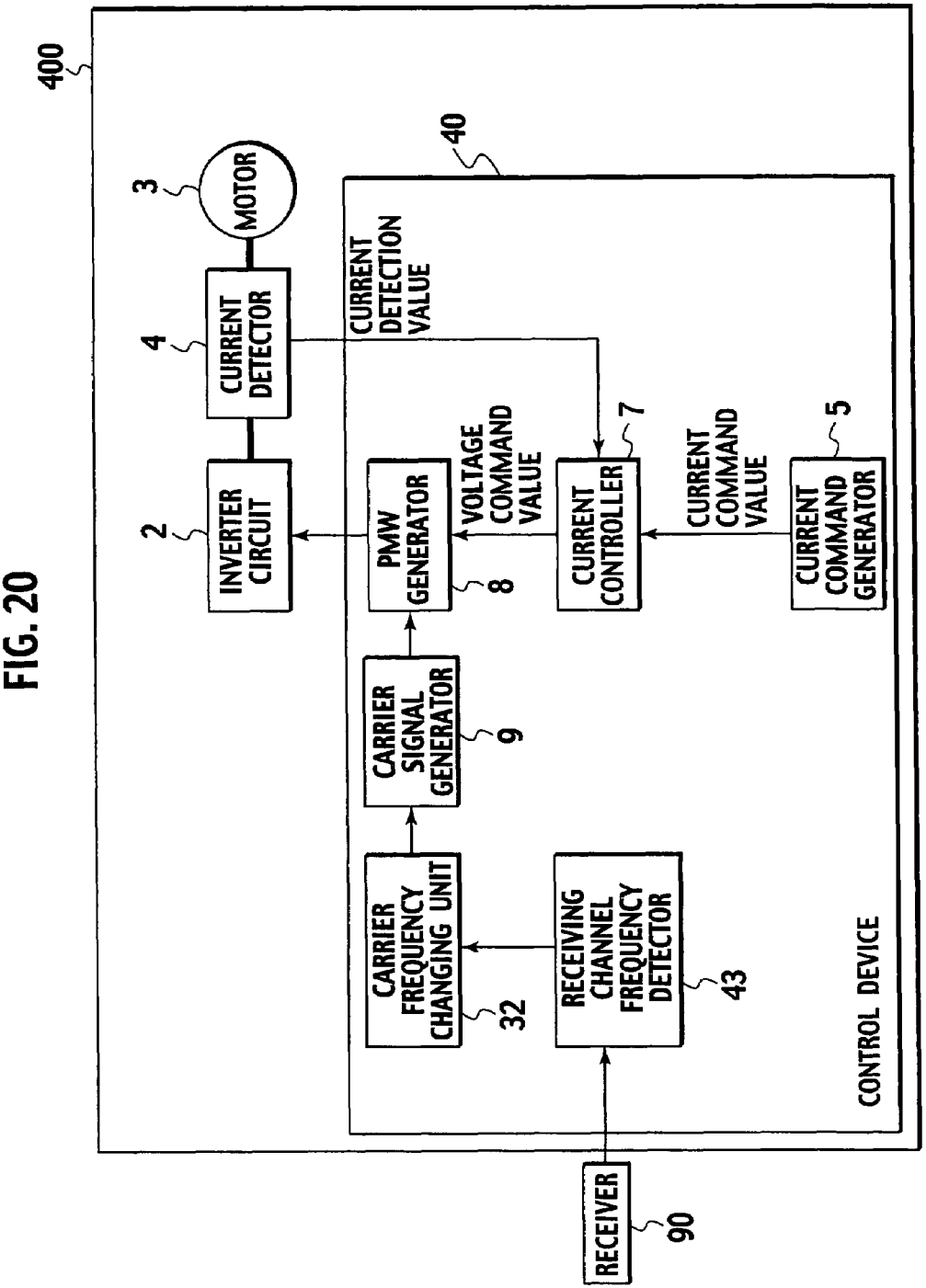
FIG. 20 is an explanatory diagram of a configuration of an inverter system according to a fourth embodiment of the present invention.

FIG. 20 is an explanatory diagram of a configuration of the inverter system 400 according to the fourth embodiment. The inverter system 400 shown in FIG. 20, which corresponds to the power conversion control apparatus in the appended claims, includes the control device 40 including the receiving channel frequency detector 43, which corresponds to the frequency setting unit including a receiving-channel frequency detecting unit in the appended claims. The receiving channel frequency detector 43 detects the frequency of the receiving channel received by a receiver 90 such as a radio placed near the inverter system 400 and takes the detected frequency as the target frequency ft. The receiving channel frequency detector 43 further calculates each value fnq of the carrier frequency f based on the target frequency ft as in the third embodiment.

To explain specifically, for example, when the receiver 90 placed near the inverter system 400 is receiving a radio broadcast from Nippon Broadcasting System, the receiving channel frequency detector 43 seeks for a receiving channel of the receiver 90 and detects a frequency at which electric force strength is high and takes the detected frequency as the target frequency ft. The frequency of Nippon Broadcasting System is 1242 kHz and therefore the target frequency ft is 1242 kHz. If it is assumed that the upper limit value fmax=25 kHz, the lower limit value fmin=20 kHz, and the predetermined value p=11.25 kHz, then the specific frequency fs is fx=ft+11.25 kHz=1253.25 kHz. The receiving channel frequency detector 43 then divides the specific frequency fs by the natural number nq and takes values included in the range between the lower limit value 20 kHz and the upper limit value 25 kHz among the divided values as each value fnq of the carrier frequency f. In the fourth embodiment, nq=51, 52, 54, 55, 57, and 62 are used as the natural number nq. Each value fnq of the carrier frequency f are as follows:

$fn51=1253.25$ kHz/51=24.574 kHz;

$fn52=1253.25$ kHz/52=24.101 kHz;

$fn54=1253.25$ kHz/54=23.208 kHz;

$fn55=1253.25$ kHz/55=22.786 kHz;

$fn57=1253.25$ kHz/57=21.987 kHz; and $fn62=1253.25$ kHz/62=20.214 kHz.

Each of the values fn51, . . . , and fn62 calculated as above is included in the range between the lower limit value 20 kHz and the upper limit value 25 kHz. The carrier frequency changing unit 32 changes the carrier frequency f with respect to time using each of the values fn511, . . . , and fn62 calculated as above.

FIGS. 21A-21C are explanatory diagrams of a change in the carrier frequency f with respect to time changed by the carrier frequency changing unit 32 and a harmonic spectrum shown in FIG. 20. FIGS. 21A,B show the change in the carrier frequency f with respect to time changed by each of the values fn51, . . . , and fn62 calculated as above and FIG. 21C shows the harmonic spectrum that occurs due to the change in the carrier frequency f with respect to time shown in FIGS. 21A, B. The channel band of an AM radio receiver in Japan is about a frequency of a receiving channel ±6 kHz. Because of this, a channel band will be the target frequency ft ±6 kHz. As shown in FIG. 21C, no noise spectrum occurs in the frequency band more than the frequency 61×fn62 of the sixty-first harmonic and less than the frequency 62×fn62=specific frequency fs of the sixty-second harmonic of fn62, which is the minimum value fa of each of the values fn51, . . . , and fn62 of the carrier frequency f. Therefore, the noise level in the channel band including the target frequency ft can be reduced as in the second embodiment.

Even when a radio broadcast being received by the receiver 90 placed near the inverter system 400 is switched to one from another radio station, the receiving channel frequency detector 43 detects the frequency of the receiving channel of the receiver 90 appropriately and sets the detected frequency as the target frequency ft, and therefore, the specific frequency fs can be changed corresponding to the change in the frequency of the receiving channel and the noise level in the channel band of the receiving channel can be reduced without fail.

Fifth Embodiment

An inverter system 500 according to the fifth embodiment is explained below with reference to FIG. 22 to FIG. 24 with points different from those of the inverter system 300 according to the third embodiment as the central points. Like configurations in the inverter system 500 according to the fifth embodiment as those in the inverter system 300 according to the third embodiment are denoted by like reference numerals, and explanations thereof will be omitted. The configuration of the inverter system 500 according to the fifth embodiment is almost the same as that of the inverter system 300 according to the third embodiment. The inverter system 500 according to the fifth embodiment differs from the third embodiment only in that a control device 50 includes a frequency map 51 and a carrier frequency changing unit 52 in place of the target frequency setting unit 31 and the carrier frequency changing unit 32.

Figure 22:
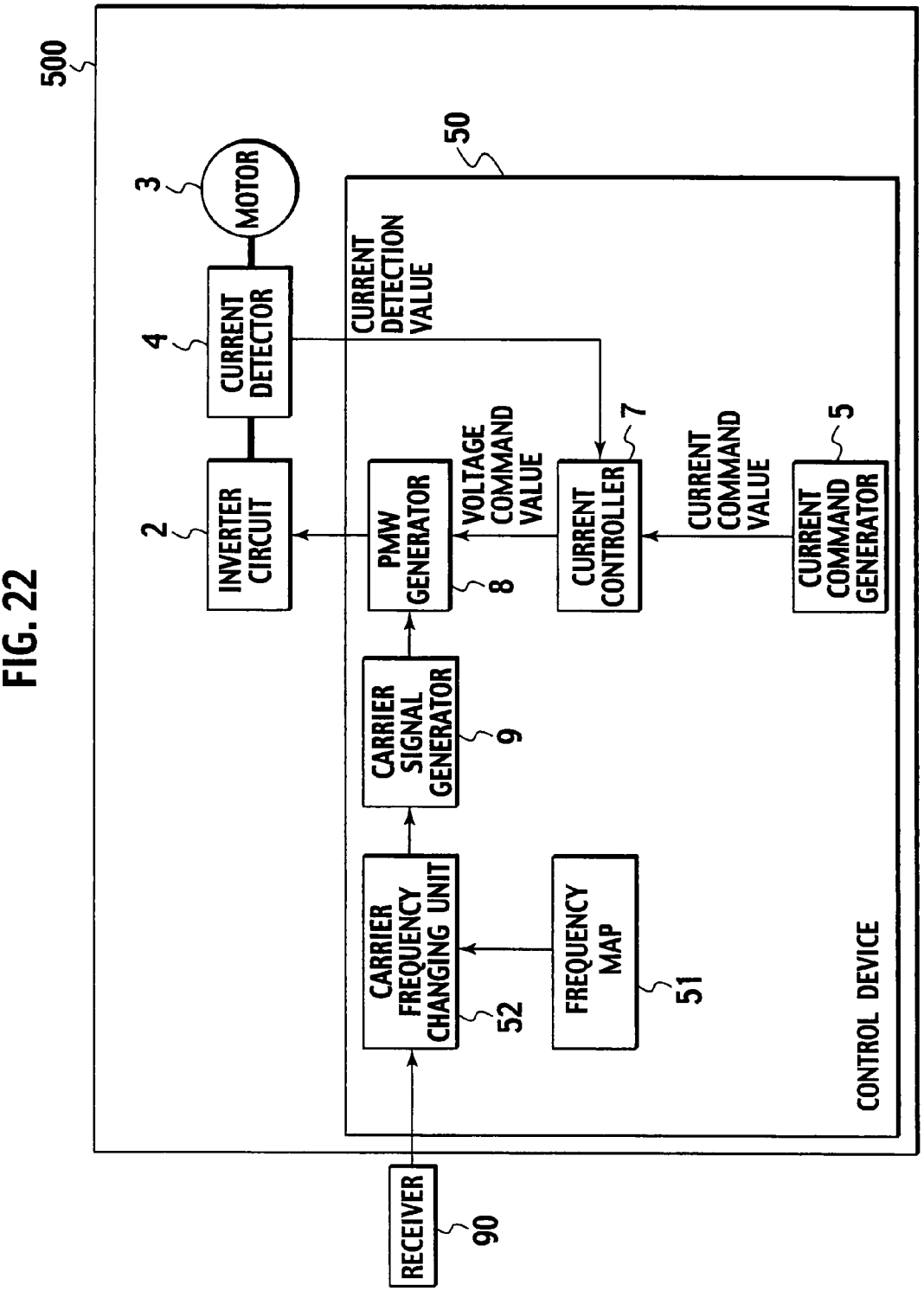
FIG. 22 is an explanatory diagram of a configuration of an inverter system according to a fifth embodiment of the present invention.
Figure 23:
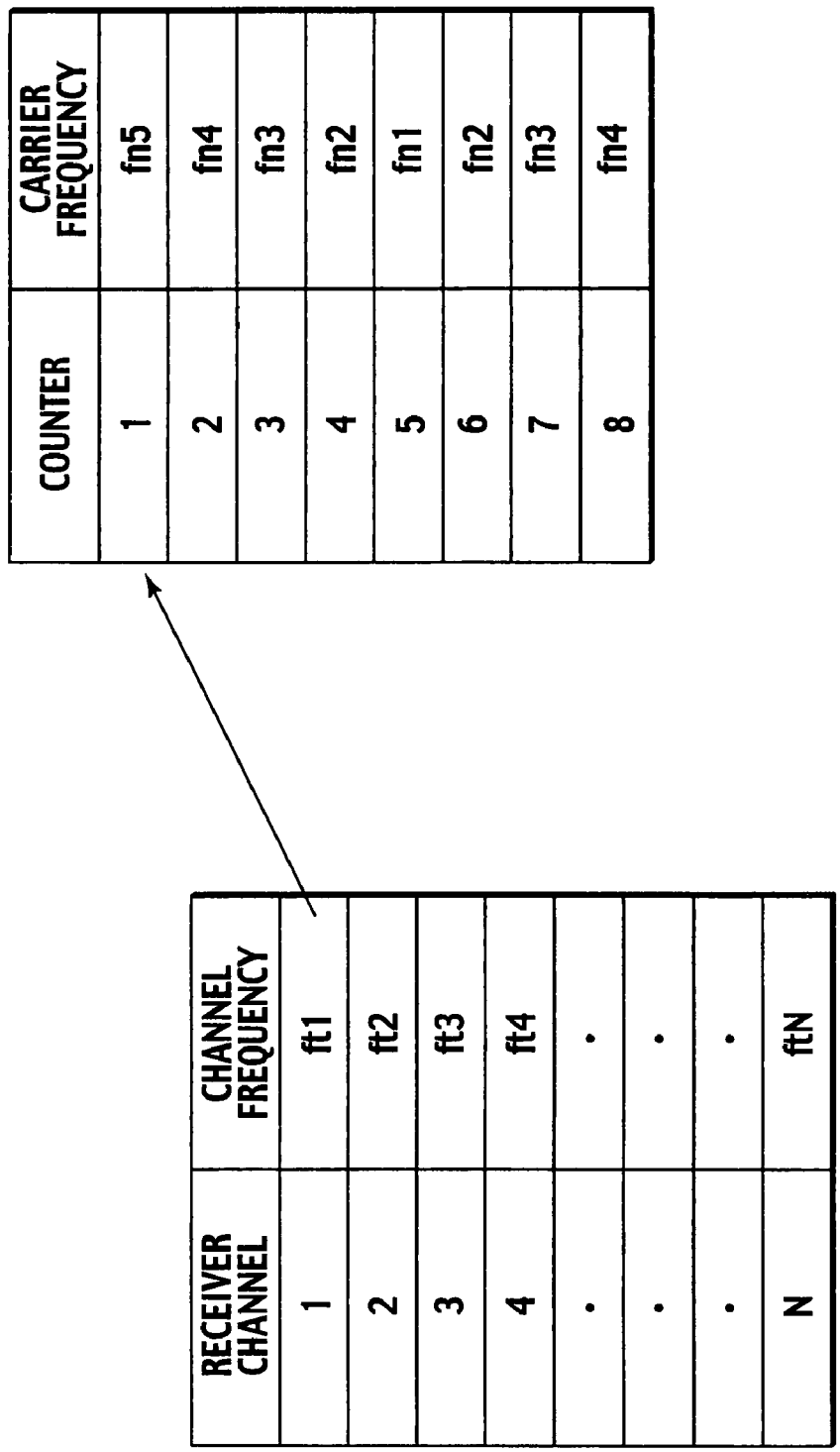
FIG. 23 is an explanatory diagram of a frequency map shown in FIG. 22.

FIG. 22 is an explanatory diagram of a configuration of the inverter system 500 according to the fifth embodiment and FIG. 23 is an explanatory diagram of the frequency map 51 shown in FIG. 22. The inverter system 500 shown in FIG. 22, which corresponds to the power conversion control apparatus in the appended claims, includes the control device 50 including the frequency map 51 and the carrier frequency changing unit 52, which corresponds to the frequency changing unit and the frequency setting unit in the appended claims. In the fifth embodiment, the receiver 90, such as a radio, is placed near the inverter system 500. The frequency map 51 is a database, in which data storing each of the values fn1, . . . , and fn5 of the carrier frequency f calculated in advance using the frequencies ft1, . . . , and ftN (hereinafter, "channel frequency") of the receiving channel of the receiver 90 as the target frequency ft associated with counters 1, ..., and 8 is stored for each of channels 1, ..., and N of the receiver 90. Each of the counters 1, ..., and 8 shows one cycle of a discrete change with respect to time in the carrier frequency f. The carrier frequency changing unit 52 reads each of the values fn1, and fn5 of the carrier frequency f corresponding to the channels 1, ..., and N of the receiver 90 stored in the frequency map 51 in the order of the counters 1, ..., and 8 and changes the carrier frequency f with respect to time both discretely and cyclically as in the third embodiment. As a result, the inverter 500 according to the fifth embodiment can obtain the same effect as that of the third embodiment.

Figure 24:
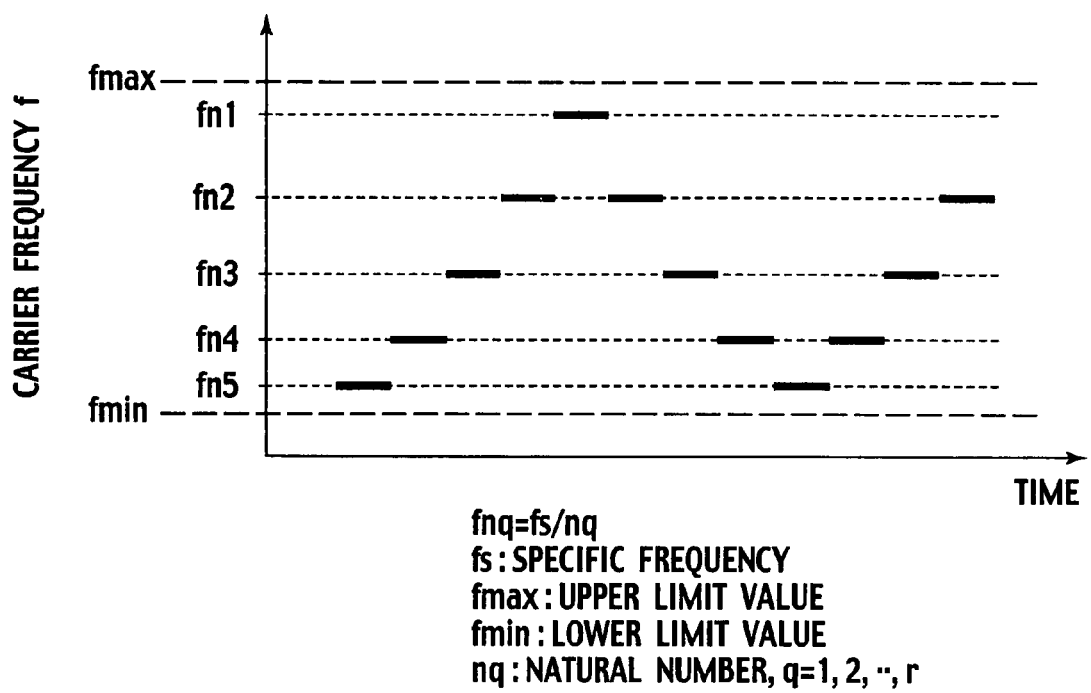
FIG. 24 is an explanatory diagram of a change in a carrier frequency with respect to time changed by the values of the carrier frequency in the frequency map shown in FIG. 23.

FIG. 24 is an explanatory diagram of a change in the carrier frequency f with respect to time changed at each of the values fn1, ..., and fn5 of the carrier frequency f of the frequency map 51 shown in FIG. 22. As shown in FIG. 24, the carrier frequency changing unit 52 changes the carrier frequency f in the order of the counters 1, ..., and 8 of the frequency map 51. Each of the values fn1, ..., and fn5 of the carrier frequency f is included in the range between the lower limit value fmin and the upper limit value fmax. Due to this, even when a radio broadcast received by the receiver 90 placed near the inverter system 500 is switched to one from another radio station, by creating the frequency map 51 in advance, it is possible to change the carrier frequency f with respect to time both discretely and cyclically using each of the values fn1, ..., and fn5 of the carrier frequency f corresponding to the channels 1, ..., and N of the receiver 90 stored in the frequency map 51 according to the setting of the receiving channel of the user's receiver 90, and therefore, the noise level in the channel band of the receiving channel can be reduce without fail.

Other Embodiment

The first to fifth embodiments described above only exemplify the present invention. The scope of the present invention is not limited thereto, and various other embodiments can be adopted within the scope of the appended claims. For example, in the first to fifth embodiments, although the waveform of the change in the carrier frequency f with respect to time is not referred to, the present invention can be applied to any waveform in any form.

In addition, in the first to fifth embodiments, the inverter system is explained as an example, which includes the inverter circuit 2 that supplies a sinusoidal alternating-current to the motor 3 by subjecting the output of the direct-current power supply to the pulse-width modulation. However, the system is not particularly limited, and the same effect can be obtained when the invention is applied to another system in which the form of power is converted by switching. For example, the invention can be applied to a configuration in which a motor is driven by the H-bridge configuration described in the conventional technique.

In the fourth embodiment, as the natural number nq, nq=51, 52, 54, 55, 57, and 67 are used. However, the number is not particularly limited, and other natural numbers can be applied as long as the frequency nq×fnq of the nq-th harmonic is included in the range between the lower limit value fmin and the upper limit value fmax. While the calculation result is shown to the third decimal place in the fourth embodiment, it is apparent that how to show the calculation result is not particularly limited.

In the second embodiment, all of the values, that is, each value fmq of the carrier frequency f calculated using (a),(b),(c) shown in FIGS. 13A,B is used. However, the value is not particularly limited, and it is possible to use only a part of each value fmq calculated using (a),(b),(c) shown in FIGS. 13A,B.

In this case, it is also possible to use each value fmq after averaging. It is also possible to use only values when the integer mq is odd.

Figure 26A:
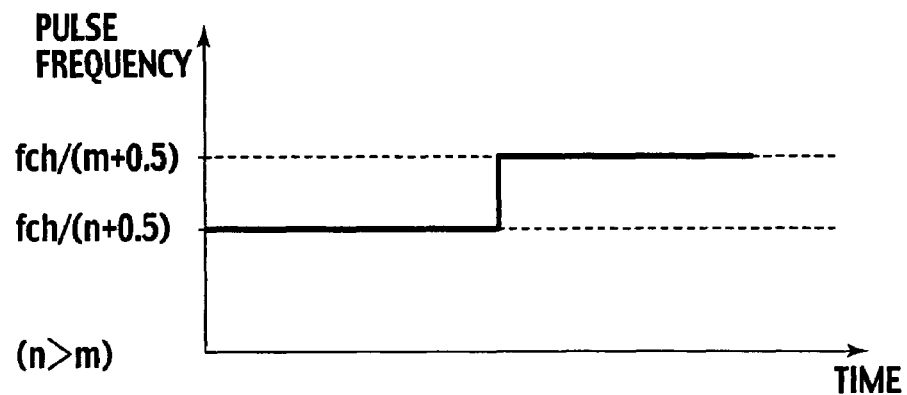
FIGS. 26A-26C show an output signal waveform obtained by switching between two repetitive signals.
Figure 26B:
Figure 26C:
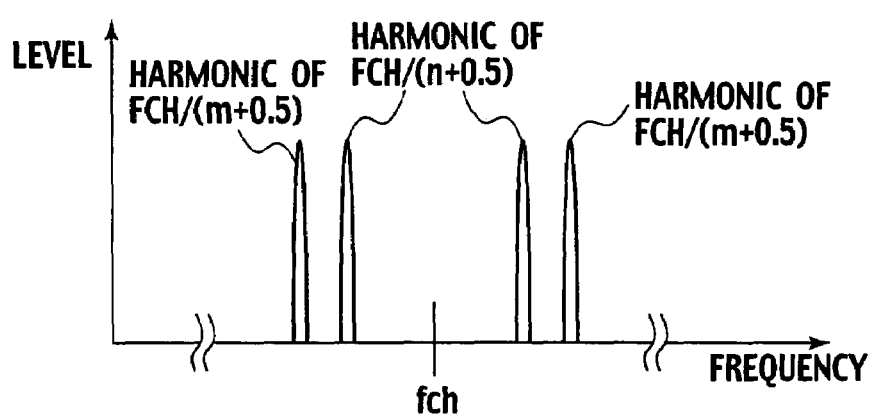
Figure 27A:
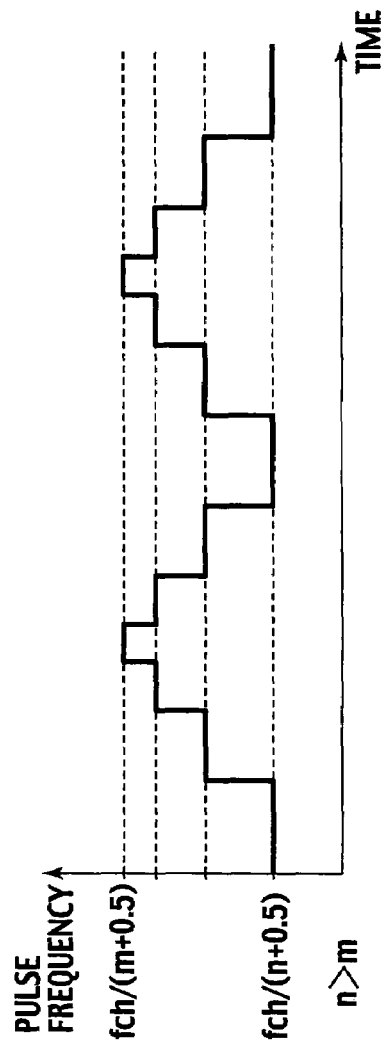
FIGS. 27A-27C show an output signal waveform obtained by switching between four repetitive signals.
Figure 27B:
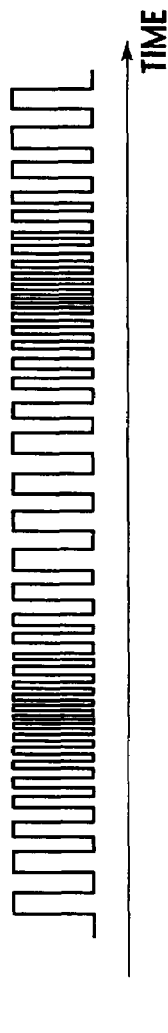
Figure 27C:
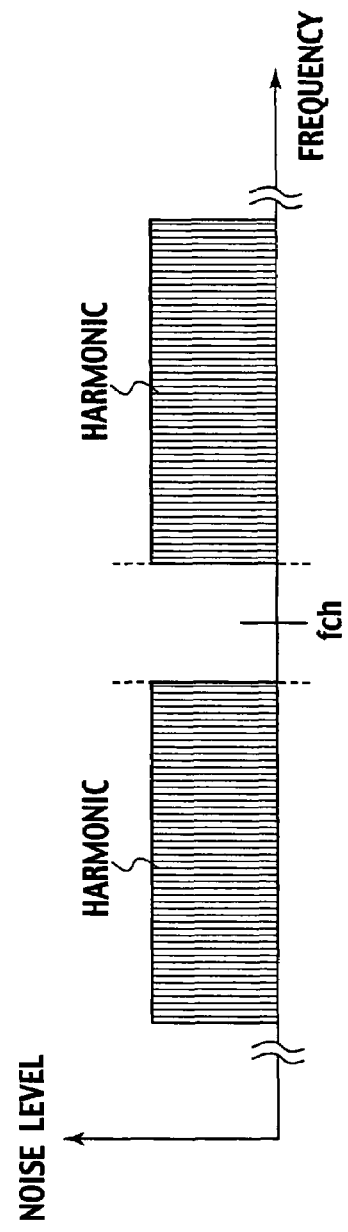

In the first to fifth embodiment, an example is explained, in which the carrier frequency f is changed with respect to time and the cycle of the carrier signal, which is the output signal, is changed, however, the cycle of the output signal can be changed by switching between two or more signal generating units. For example, as shown in FIG. 25, a repetitive signal generating device 600 constituted by a repetitive signal generator 601 that generates a first repetitive signal, a repetitive signal generator 602 that generates a second repetitive signal having a frequency higher than that of the first repetitive signal, and a switching unit 603 that switches between the first repetitive signal and the second repetitive signal can be used. A case where the first and second repetitive signals are pulse-shaped is explained using FIG. 26A. In FIG. 26A, the vertical axis represents the frequency of a pulse signal, the horizontal axis represents time, and the channel frequency is denoted by fch. A value obtained by dividing fch by n+0.5 (n is an integer) is used as the frequency of a pulse signal of the repetitive signal generator 601 and a value obtained by dividing fch by m+0.5 (m is an integer, n>m) is used as the frequency of a pulse signal of the repetitive signal generator 602. By switching between the pulse signal of the repetitive signal generator 601 and the pulse signal of the repetitive signal generator 602 at predetermined points of time, an output waveform of the pulse signal as shown in FIG. 26B is obtained and it can be seen from FIG. 26C that in the harmonic spectrum of the output waveform, no harmonic spectrum stands at the channel frequency fch. Because of this, the impact of noises can be reduced at a specific frequency. Although a case where there are two repetitive signal generators is explained, four repetitive signal generators can be used to change as shown in FIG. 27A to FIG. 27C, not limited to this case. This can be applied to any one in which a repetitive signal is generated and its harmonic level can be reduced, and therefore, this can also be applied to a carrier signal of PWM that generates a repetitive triangular wave, a clock generator in a microcomputer or the like that generates a repetitive rectangular wave (pulse), and as a method of generating a clock.

In the first embodiment, the carrier frequency changing unit 6 selects each value fmq of the carrier frequency from among the values each of which being the channel frequency fch divided by the integer mq+0.5. However, this is not particularly limited, and each value fmq of the carrier frequency f can be selected from values each of which being the channel frequency fch divided by the integer mq+α (0<α<1). In the same manner, in the second embodiment, the carrier frequency changing unit 24 selects each value fmq of the carrier frequency from among the values fb calculated by fb=(fch±(fmin−BAND)/2)/(mq+0.5). However, this is not particularly limited, and each value fmq of the carrier frequency f can be selected from values fb divided by fb=(fch±(fmin−BAND)/2)/(mq+α) (0<α<1). In the same manner, in the case where the cycle of the output signal is changed by switching between the two or more signal generators described above, a value obtained by dividing fch by n+0.5 (n is an integer) is used as the frequency of the pulse signal of the repetitive signal generator 601 and a value obtained by dividing fch by m+0.5 (m is an integer, n>m) is used as the frequency of the pulse signal of the repetitive signal generator 602, however, this is not limited, and a value obtained by dividing fch by n+α (0<α<1, n is an integer) can be used as the frequency of the pulse signal of the repetitive signal generator 601 and a value obtained by dividing fch by m+α (0<α<1, m is an integer, n>m) can be used as the frequency of the pulse signal of the repetitive signal generator 602.

According to the present invention, since the frequency of the carrier wave is changed so that electromagnetic noises are not concentrated in the target frequency, it is possible to control the target frequency in which the electromagnetic noises are not concentrated and a band in which the electromagnetic noises are concentrated and the electromagnetic noises that occur in the target frequency can be reduced below the predetermined value.

Description has been made of the embodiments to which the invention created by the inventors of the present invention is applied. However, the present invention is not limited to the descriptions and the drawings, which form a part of the disclosure of the present invention according to these embodiments. Specifically, all of other embodiments, examples, operational techniques and the like, which are made by those skilled in the art based on these embodiments, are naturally incorporated in the scope of the present invention. The above is additionally described at the end of this specification.

The entire content of Japanese Patent Application No. TOKUGAN 2006-280901 with a filing date of Oct. 16, 2006, and Japanese Patent Application No. TOKUGAN 2007-184388 with a filing date of Jul. 13, 2007, is hereby incorporated by reference.

What is claimed is:

1. A power conversion control apparatus comprising:
a command value output unit that outputs a command value;
a carrier wave output unit that outputs a carrier wave;
a frequency changing unit that changes a frequency of the carrier wave;
a control signal generating unit that compares the command value with the carrier wave and generates a control signal corresponding to the comparison result;
an output unit that outputs an output value based on the control signal; and
a frequency setting unit that sets a target frequency and calculates a specific frequency from the target frequency, wherein
the frequency changing unit changes the frequency of the carrier wave so that the specific frequency matches with a harmonic component of the frequency of the carrier wave.

2. The power conversion control apparatus according to claim 1, wherein the specific frequency is the target frequency plus a predetermined value.

3. The power conversion control apparatus according to claim 2, wherein if a lower limit value to which the frequency of the carrier wave can be set is assumed to be fmin, the predetermined value is more than zero and less than fmin.

4. The power conversion control apparatus according to claim 1, wherein the frequency setting unit selects the frequency of the carrier wave from among those each of which being the specific frequency divided by a natural number nq (q: 1, 2, . . . , r).

5. The power conversion control apparatus according to claim 2, wherein the frequency setting unit comprising a receiving-channel frequency detecting unit that detects a channel frequency of a receiver sets the channel frequency detected by the receiving-channel frequency detecting unit as the target frequency and then calculates the frequency of the carrier wave.

6. The power conversion control apparatus according to claim 5, wherein the frequency setting unit selects the frequency of the carrier wave from among those each of which being the specific frequency calculated from the target frequency divided by the natural number nq (q: 1, 2, . . . , r).

7. The power conversion control apparatus according to claim 2, comprising a frequency map, which is a database in which the frequency of the carrier frequency calculated in advance using the channel frequency of the receiver as the target frequency is stored for each channel of the receiver, wherein
the frequency setting unit extracts the frequency of the carrier wave corresponding to the channel detected from the receiver from the frequency map.

8. The power conversion control apparatus according to claim 5, wherein the frequency setting unit selects the frequency of the carrier wave from those each of which being the channel frequency divided by an integer mq (q: 1, 2, . . . , r) plus a predetermined value α (0<α<1).

9. The power conversion control apparatus according to claim 8, wherein the frequency setting unit comprises a channel band detecting unit that detects a channel band of the channel frequency of the receiver; and
when the channel frequency is denoted by fch, the channel band is denoted by BAND, the lower limit value to which the frequency of the carrier wave can be set is denoted by fch, and an arbitrary integer is denoted by mq (q: 1, 2, . . . , r), the frequency setting unit selects the frequency of the carrier wave from among values fb calculated by fb=(fch±(fmin−BAND)/2)/(mq+α).

10. The power conversion control apparatus according to claim 8, wherein the predetermined value α is 0.5.

11. A power conversion control method comprising steps of:
outputting a command value;
outputting a carrier wave;
comparing the command value with the carrier wave and then generating a control signal according to the comparison result;
outputting an output value based on the control signal;
setting a target frequency and calculating a specific frequency from the target frequency; and
changing a frequency of the carrier wave so that the specific frequency matches with a harmonic component of the frequency of the carrier wave.

12. A power conversion control apparatus comprising:
a command value output means for outputting a command value;
a carrier wave output means for outputting a carrier wave;
a frequency changing means for changing a frequency of the carrier wave;
a control signal generating means for comparing the command value with the carrier wave and for generating a control signal corresponding to the comparison result;
an output means for outputting an output value based on the control signal; and
a frequency setting means for setting a target frequency and for calculating a specific frequency from the target frequency, wherein
the frequency changing means changes the frequency of the carrier wave so that the specific frequency matches with a harmonic component of the frequency of the carrier wave.

* * * * *

UNITED STATES PATENT AND TRADEMARK OFFICE
CERTIFICATE OF CORRECTION

PATENT NO. : 7,567,048 B2 Page 1 of 1
APPLICATION NO. : 11/907343
DATED : July 28, 2009
INVENTOR(S) : Kentarou Shin, Kraisorn Throngnumchai and Yasuaki Hayami It is certified that error appears in the above-identified patent and that said Letters Patent is hereby corrected as shown below:

On the Title Page of the Patent include the Foreign Application Priority Data:

(30)   Foreign Application Priority Data

Oct. 16, 2006   (JP)......................2006-280901
Jul. 13, 2007   (JP)......................2007-184388

Signed and Sealed this

Eleventh Day of May, 2010

David J. Kappos
*Director of the United States Patent and Trademark Office*